US010304164B2

(12) United States Patent
Nakada

(10) Patent No.: US 10,304,164 B2
(45) Date of Patent: May 28, 2019

(54) IMAGE PROCESSING APPARATUS, IMAGE PROCESSING METHOD, AND STORAGE MEDIUM FOR PERFORMING LIGHTING PROCESSING FOR IMAGE DATA

(71) Applicant: CANON KABUSHIKI KAISHA, Tokyo (JP)

(72) Inventor: Yuichi Nakada, Yokohama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 28 days.

(21) Appl. No.: 15/581,073

(22) Filed: Apr. 28, 2017

(65) Prior Publication Data

US 2017/0323465 A1 Nov. 9, 2017

(30) Foreign Application Priority Data

May 9, 2016 (JP) ................................ 2016-094074

(51) Int. Cl.

*G06T 9/00* (2006.01)
*G06T 5/00* (2006.01)
*G06K 9/00* (2006.01)

(52) U.S. Cl.

CPC .............. *G06T 5/002* (2013.01); *G06T 5/007* (2013.01); *G06K 9/00255* (2013.01); *G06T 2207/20012* (2013.01); *G06T 2207/30201* (2013.01)

(58) Field of Classification Search

CPC ..................... G06T 11/60; G06T 5/002; G06T 2207/10024; G06T 2207/30201; G06K 9/00281; G06K 9/00228; G06K 9/481

See application file for complete search history.

(56) References Cited

U.S. PATENT DOCUMENTS

| | | | | | |
|---|---|---|---|---|---|
| 4,834,541 | A * | 5/1989 | Yamaba | .................... | G01J 3/02 250/226 |
| 6,026,249 | A * | 2/2000 | Sasaki | .................... | G03B 17/24 360/18 |
| 2003/0096647 | A1* | 5/2003 | Ouchi | .................... | A63F 13/00 463/30 |
| 2009/0310981 | A1* | 12/2009 | Ishida | .................... | G03G 15/65 399/17 |

(Continued)

FOREIGN PATENT DOCUMENTS

JP 2009-267662 A 11/2009

*Primary Examiner* — Amir Alavi

(74) *Attorney, Agent, or Firm* — Carter, DeLuca & Farrell LLP

(57) ABSTRACT

An image processing apparatus according to the present invention includes: a generation unit configured to generate normal image data recording normal information for each of a plurality of areas at least part of which is different from one another in image data and for each pixel of the area; a setting unit configured to set one of at least two or more smoothness degrees different from one another to each of a plurality of pieces of generated normal image data; a smoothing unit configured to smooth each of the plurality of pieces of normal image data in the set smoothness degree; an integration unit configured to generate integrated normal image data corresponding to pixel arrangement of the image data by integrating the plurality of pieces of smoothed normal image data; and a lighting processing unit configured to perform lighting processing for the image data based on the integrated normal image data.

11 Claims, 24 Drawing Sheets

(56) References Cited

U.S. PATENT DOCUMENTS

| | | | | |
|---|---|---|---|---|
| 2013/0230293 | A1* | 9/2013 | Boyle | H04N 5/2251 386/224 |
| 2016/0307324 | A1* | 10/2016 | Nakada | G06K 9/6215 |
| 2017/0154409 | A1* | 6/2017 | Murakami | G02B 21/365 |
| 2017/0206637 | A1* | 7/2017 | Hirai | G06T 5/002 |
| 2017/0323465 | A1* | 11/2017 | Nakada | G06T 11/60 |

* cited by examiner

IMAGE PROCESSING APPARATUS, IMAGE PROCESSING METHOD, AND STORAGE MEDIUM FOR PERFORMING LIGHTING PROCESSING FOR IMAGE DATA

BACKGROUND OF THE INVENTION

Field of the Invention

The present invention relates to a technique to generate an image that seems to have been captured under desired illumination conditions based on a captured image.

Description of the Related Art

At the time of capturing an image of a photo or a video, illumination is one of the significant factors that determine an impression of a subject. It is possible to display a subject in three dimensions in accordance with an intention of a person who captures an image of the subject by effectively arranging illuminations. However, there is a case where an image is captured under illumination conditions not in accordance with an intention of a person who captures the image. For example, in the case where image capturing is performed in the state of being against light, a dark image of a subject is captured. Alternatively, in the case where an image of a subject is captured by irradiating the subject with light using a strobe, there is a possibility that the subject seems to be flat because the shade is lost. As a method of correcting these captured images, the method using a 3D model corresponding to a subject is known (Japanese Patent Laid-Open No. 2009-267662). According to Japanese Patent Laid-Open No. 2009-267662, lighting of a subject is changed by performing rendering processing of CG (Computer Graphics) using a 3D model corresponding to the subject under predetermined virtual illumination conditions and replacing the subject image in the captured image with a CG image having been subjected to rendering. In the technique described in Japanese Patent Laid-Open No. 2009-267662, the 3D model to be replaced with the subject image is determined from 3D models prepared in advance.

In the case of generating another image that seems to have been captured under illumination conditions desired by a person who captures an image from a captured image, it is preferable for an image to which the shade in accordance with the pose and expression of the subject is attached to be obtained. However, the method of Japanese Patent Laid-Open No. 2009-267662 has the following problem. For example, in the case where a subject in a captured image is replaced with the results of performing rendering using a 3D model of the subject, the pose and expression of the subject in the processing results are replaced with the pose and expression of the 3D model prepared in advance, and therefore, unnatural results are obtained. Further, in order to deal with a variety of poses and expressions, it is necessary to prepare in advance 3D models in the number corresponding to the number of combinations of the pose and expression. In this case, the amount of data of 3D models becomes very large and it is also difficult to select an appropriate model from the large number of 3D models.

SUMMARY OF THE INVENTION

The image processing apparatus according to the present invention includes: a generation unit configured to generate normal image data recording normal information for each of a plurality of areas at least part of which is different from one another in image data and for each pixel of the area; a setting unit configured to set one of at least two or more smoothness degrees different from one another to each of a plurality of pieces of generated normal image data; a smoothing unit configured to smooth each of the plurality of pieces of normal image data in the smoothness degree set by the setting unit; an integration unit configured to generate integrated normal image data corresponding to pixel arrangement of the image data by integrating the plurality of pieces of normal image data smoothed by the smoothing unit; and a lighting processing unit configured to perform lighting processing for the image data based on the integrated normal image data.

Further features of the present invention will become apparent from the following description of exemplary embodiments with reference to the attached drawings.

DESCRIPTION OF THE EMBODIMENTS

In the following, with reference to the attached drawings, preferred embodiments of the present invention are explained. The configurations shown in the following embodiments are merely exemplary and the present invention is not limited to the configurations shown schematically.

First Embodiment

<Appearance of Image Capturing Apparatus>

Figure 1A:
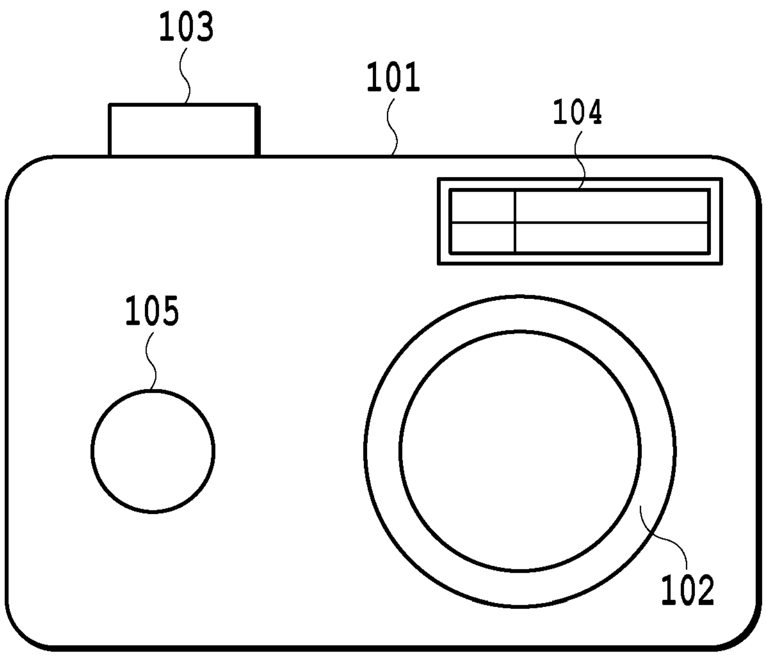
FIG. 1A is a diagram showing an appearance of a front surface of an image capturing apparatus according to a first embodiment.
Figure 1B:
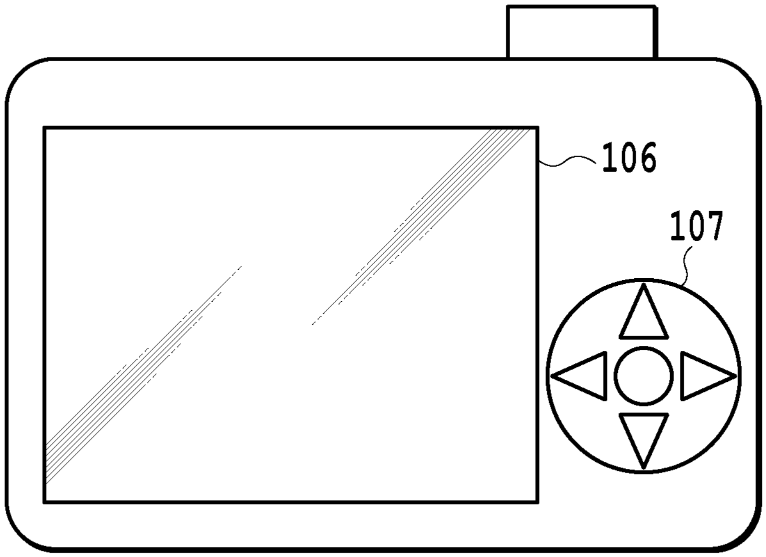
FIG. 1B is a diagram showing an appearance of a rear surface of the image capturing apparatus according to the first embodiment.

FIG. 1A and FIG. 1B are diagrams showing appearances of an image capturing apparatus according to the present embodiment. In the present embodiment, as an example making up an image capturing apparatus, a digital camera is explained, but the image capturing apparatus that can be applied to the present embodiment is not limited to this. For example, the image capturing apparatus that can be applied to the present embodiment may be an information processing apparatus, such as a mobile telephone, a tablet device, and a personal computer, or may be made up as an image capturing apparatus, such as a mobile telephone with a camera. FIG. 1A shows the appearance of the front surface of the image capturing apparatus and FIG. 1B shows the appearance of the rear surface. An image capturing apparatus 101 has an optical unit 102, an image capturing button 103, a strobe 104, a distance acquisition unit 105, a display unit 106, and an operation button 107.

The optical unit 102 is a lens barrel made up of a zoom lens, a focus lens, a camera shake correction lens, an aperture stop, and a shutter and collects light information on a subject. The image capturing button 103 is a button for a user to give instructions to start image capturing to the image capturing apparatus 101. The strobe 104 is an illumination capable of emitting light in accordance with the start of image capturing according to user instructions.

The distance acquisition unit 105 is a distance acquisition module configured to acquire distance image data of a subject with the image capturing apparatus 101 as a reference in response to image capturing instructions. The distance image data means image data storing a subject distance corresponding to each pixel as a pixel value of the pixel of an image. In the present embodiment, it is assumed that in a pixel (i, j) making up distance image data, coordinate values of each subject with the image capturing apparatus 101 as a reference are stored as a pixel value. That is, a pixel value D (i, j) in the distance image data is represented by x (i, j), y (i, j), and z (i, j). Here, it is assumed that the x-axis is the direction horizontal to the image capturing apparatus 101, the y-axis is the direction perpendicular to the image capturing apparatus 101, and the z-axis is the optical axis direction of the image capturing apparatus 101.

In the present embodiment, the distance acquisition unit 105 includes an infrared light-emitting unit configured to emit infrared light and a light reception unit configured to receive infrared light reflected from a subject, and calculates a distance value from the image capturing apparatus to the subject based on a time taken for the emitted infrared light to be reflected from the subject and received. Then, the distance acquisition unit 105 calculates position information on the subject based on the calculated distance value and distance image capturing information including the number of sensor pixels of the reception unit, an angle of view and the like, and generates distance image data. The configuration of the distance acquisition unit 105 is not limited to the above-described configuration and any configuration may be accepted as long as the configuration can acquire distance image data. For example, it may also be possible to make up the distance acquisition unit 105 so as to acquire distance image data by being provided with an optical system similar to the optical unit 102 and by performing triangulation based on disparity between data of images captured from two different viewpoints.

The display unit 106 is made up by using a liquid crystal display or the like and displays image data processed by the image capturing apparatus 101 and other various kinds of data. In the present embodiment, the image capturing apparatus 101 is not provided with an optical finder, and therefore, a framing operation (check of focus and composition) is performed by using the display unit 106. That is, a user performs image capturing while checking a live view image displayed by the display unit 106, and therefore, it can be said that the display unit 106 functions as an electronic finder while a user is performing framing and focusing operations. On the display unit 106, a camera setting menu is displayed as well as a live view displaying an image capturing range real time is displayed.

The operation button 107 is a button for a switching operation of the operation modes of the image capturing apparatus 101 and for a user to specify various parameters and the like at the time of image capturing to the image capturing apparatus 101. In the present embodiment, as one of the operation modes, a lighting processing mode of correcting the way a captured image is illuminated after image capturing is included. It is possible for a user to switch to the lighting processing mode, to set illumination parameters of a virtual illumination used for the lighting processing, to select a subject area, and so on by using the operation button 107 or the image capturing button 103. Further, it is also possible for a user to specify whether or not to output distance image data at the time of outputting corrected image data. In addition, the display unit 106 may have a touch screen function and in this case, it is also possible to handle user instructions using the touch screen as an input through the operation button 107.

<Internal Configuration of Image Capturing Apparatus>

Figure 2:
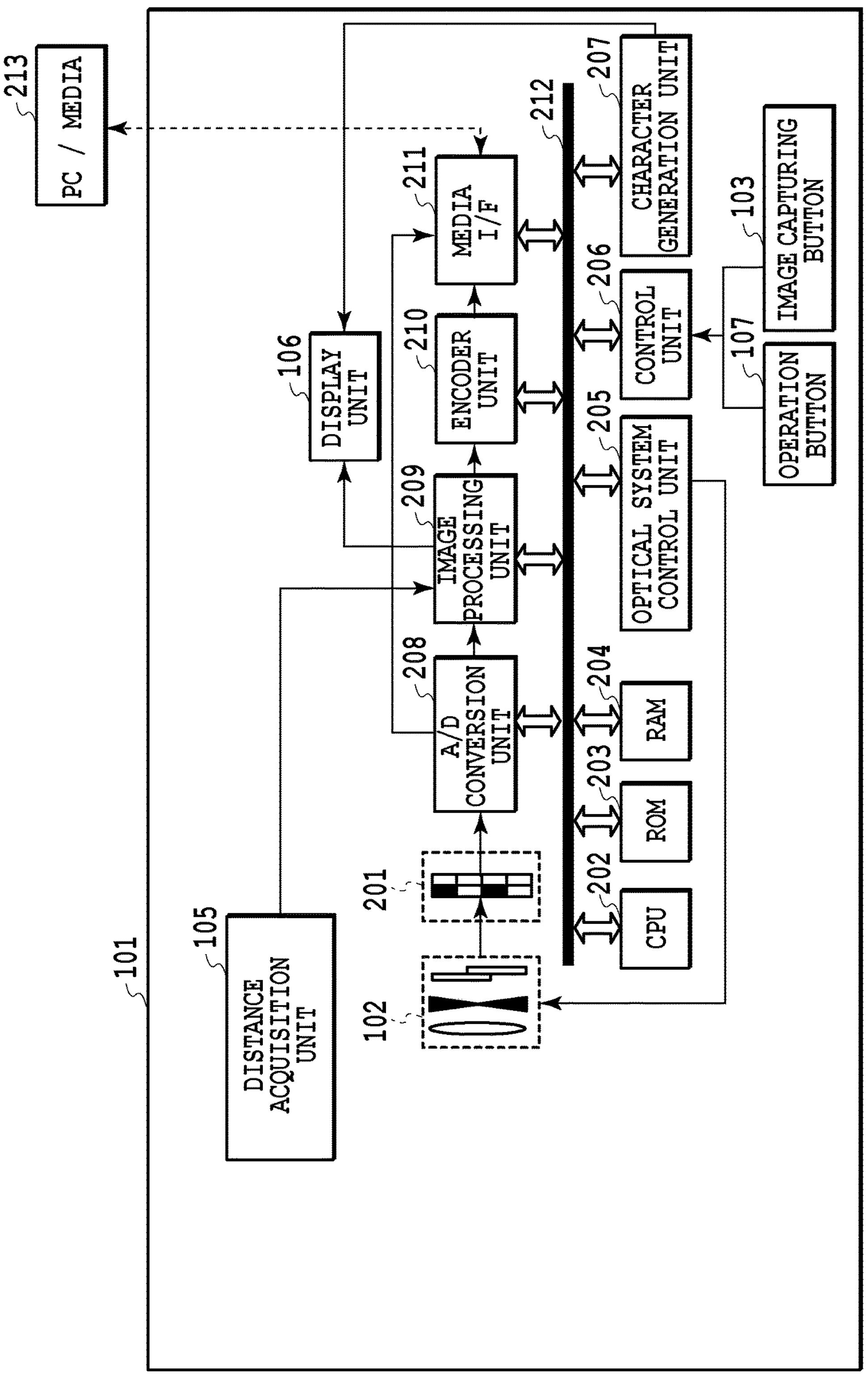
FIG. 2 is a block diagram showing an internal configuration of the image capturing apparatus in the first embodiment.

FIG. 2 is a block diagram showing an internal configuration of the image capturing apparatus 101 in the present embodiment. A CPU 202 is involved in all processing of each configuration and sequentially reads commands stored in a ROM (Read Only Memory) 203 or a RAM (Random Access Memory) 204, interprets the commands, and performs processing in accordance with the interpretation results. A system bus 212 is a bus to transmit and receive data. In the present embodiment, it is assumed that a face normal model and a face organ normal model are stored in the ROM 203. The face normal model includes normal image data storing normal vectors of a face surface corresponding to a face in a predetermined shape as pixel values and organ position information indicating the position of an organ, such as the eye, the nose, and the mouth, in the normal image data. The face organ normal model includes normal image data storing normal vectors corresponding to the area of a face organ, such as the eye, the nose, and the mouth, as pixel values and organ position information indicating the organ position in the normal image data.

A control unit 206 performs control of, such as image capturing, switching of lighting processing mode, selection of a subject area, setting of illumination parameters, and switching of distance image data output modes, by user instructions from the image capturing button 103 or the operation button 107. In the present embodiment, the control unit 206 controls flags SW1 and SW2 in accordance with user instructions. The flag SW1 turns ON in the case where instructions to set the lighting processing effective are given, and turns OFF in the case where instructions to set the lighting processing ineffective are given. The flag SW2 turns ON in the case where instructions to output distance image data are given, and turns OFF in the case where instructions not to output distance image data are given. In actuality, each of the flags SW1 and SW2 is a bit signal within the RAM 204 and the state of 0 indicates OFF and the state of 1 indicates ON. The control unit 206 switches between these bit states.

An optical system control unit 205 performs control specified by the CPU 202 of, such as focusing, shutter opening, and aperture stop adjustment for the optical unit 102. A color image capturing element unit 201 includes an image capturing element group that converts light information collected by the optical unit 102 into a current value and a color filter having a predetermined array, such as a Bayer array, and acquires color information on a subject from the light collected by the optical unit 102. An A/D conversion unit 208 converts color information on a subject acquired by the color image capturing element unit 201 into a digital signal value and generates RAW image data. In the present embodiment, it is possible to acquire distance image data and RAW image data whose images are captured at the same time.

An image processing unit 209 performs development processing for RAW image data generated by the A/D conversion unit 208 and generates color image data. Further, the image processing unit 209 performs various kinds of image processing for color image data. In the present embodiment, the image processing unit 209 performs lighting processing to add a virtual light source to color image data based on color image data and distance image data and generates lighting corrected image data. The function configuration of the image processing unit 209 will be described later in detail.

Further, a character generation unit 207 generates characters, graphics and the like. The characters and graphics generated by the character generation unit 207 are displayed on the displaying unit 106 in the state of being superimposed on the lighting corrected image data and the like generated by the image processing unit 209. An encoder unit 210 performs processing to convert various kinds of image data including color image data processed by the image processing unit 209 and lighting corrected image data generated by the lighting processing into a file format, such as Jpeg. A media I/F 211 is an interface to transmit and receive image data to and from a PC/media 213 (e.g., hard disk, memory card, CF card, SD card and the like). As the media I/F 211, for example, a USB (Universal Serial Bus) and the like is used.

<Function Configuration of Image Processing Unit>

Figure 3:
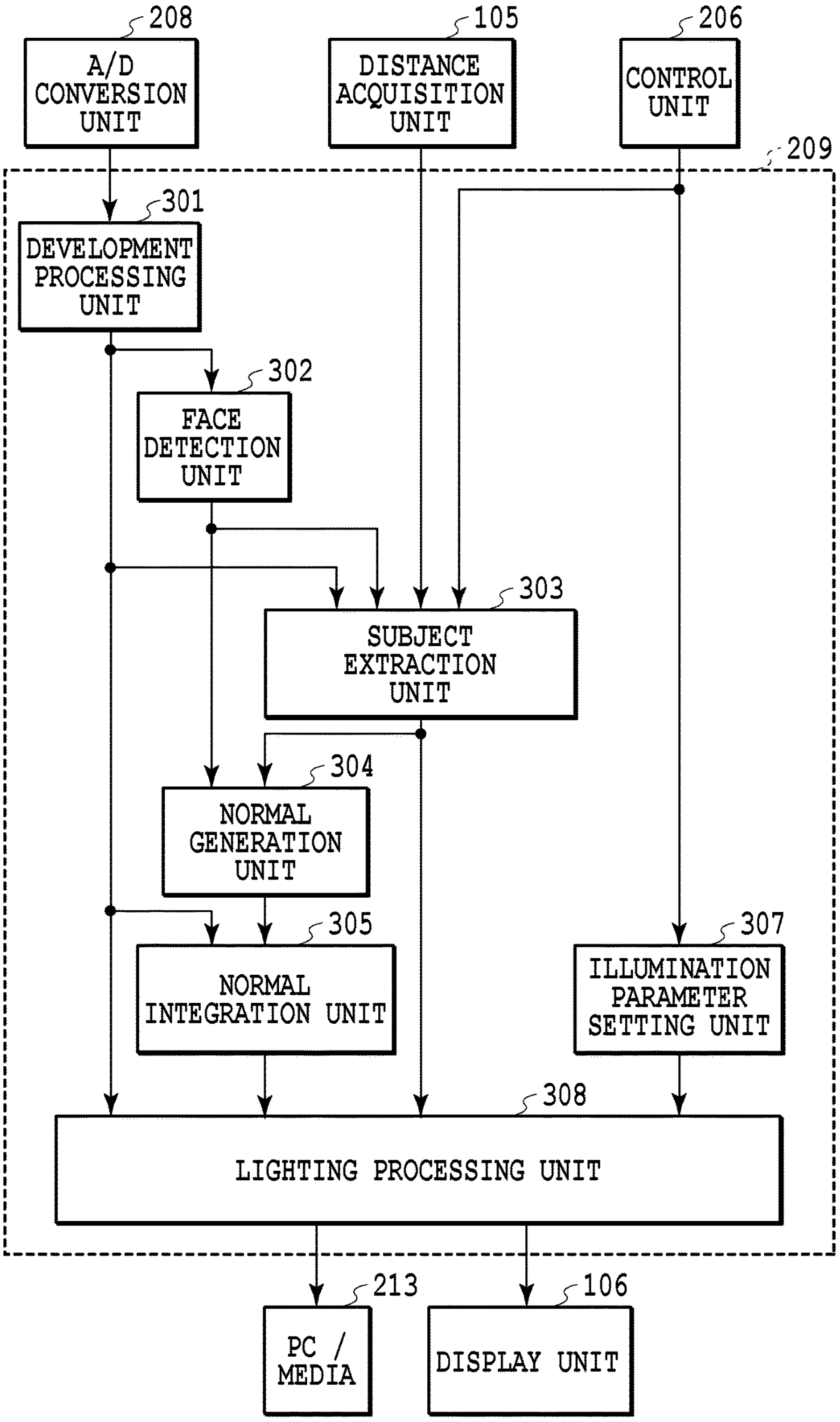
FIG. 3 is a block diagram showing a function configuration of an image processing unit in the first embodiment.

FIG. 3 is a block diagram showing a function configuration of the image processing unit 209 in the present embodiment. A development processing unit 301 acquires RAW image data from the A/D conversion unit 208. Then, the development processing unit 301 performs white balance processing, demosaicking processing, noise reduction processing, color conversion processing, edge enhancement processing, gamma processing and the like for the RAW image data and generates color image data. The generated color image data may be output to the display unit 106 and displayed thereon, or stored in a storage device, such as the RAM 204 and the PC/media 213. The processing performed by the development processing unit 301 is not limited to the above-described processing and the above-described processing may be performed twice or more or the number of pieces of processing may be increased or decreased in accordance with whether or not necessary. In the present embodiment, the development processing unit 301 generates color image data without performing gamma processing and outputs the color image data to a lighting processing unit 308.

A face detection unit 302 detects face information on a subject from the color image data generated by the development processing unit 301. The face information on a subject includes at least information relating to a face area indicating an area occupied by the face of a subject in the color image data, and information relating to the organ position indicating the position of the eye, the mouth and the like included in the face in the color image data.

A subject extraction unit 303 extracts a subject area from distance image data based on the color image data, the face information, the subject position selected by a user, and generates subject distance image data corresponding to the subject area. In the present embodiment, the subject distance image data mainly stores a distance value corresponding to a person corresponding to the selected subject position. It may also be possible to automatically determine the subject position based on face information in place of a user selecting the subject position. In the case where a plurality of pieces of face information is included, it may also be possible to give priority to the face located nearer to the front.

A normal generation unit 304 estimates the normal vector for each pixel of the subject area based on the subject distance image data generated by the subject extraction unit 303 and generates subject normal image data corresponding to the subject area. Further, the normal generation unit 304 deforms the face normal model and the face organ normal model stored in the ROM 203 based on the face information detected by the face detection unit 302 and the color image data generated by the development processing unit 301. Due to this, the normal generation unit 304 generates face normal image data and a plurality of pieces of face organ normal image data corresponding to the face area and the face organ area, respectively.

A normal integration unit 305 integrates the subject normal image data, the face normal image data, and the face organ normal image data generated by the normal generation unit 304 and generates integrated normal image data. At this time, smoothing processing is performed based on the color image data generated by the development processing unit 301.

An illumination parameter setting unit 307 sets illumination parameters based on a user operation obtained from the control unit 206. The illumination parameters in the present embodiment include the position, the pose, the intensity, the light source color and the like of the illumination.

The lighting processing unit 308 performs lighting processing to add a virtual light source to color image data and generates lighting corrected image data. The lighting processing is performed based on the subject distance image data generated by the subject extraction unit 303, the integrated normal image data generated by the normal integration unit 305, and the illumination parameters set by the illumination parameter setting unit 307. The lighting corrected image data generated by the lighting processing may be output to a storage device, such as the RAM 204 and the PC/media 213, and stored therein, or may be output to the display unit 106 and displayed thereon. The lighting corrected image data may be subjected to color processing, such as gamma processing, before being output.

<Processing Flow of Image Processing Unit>

Figure 4:
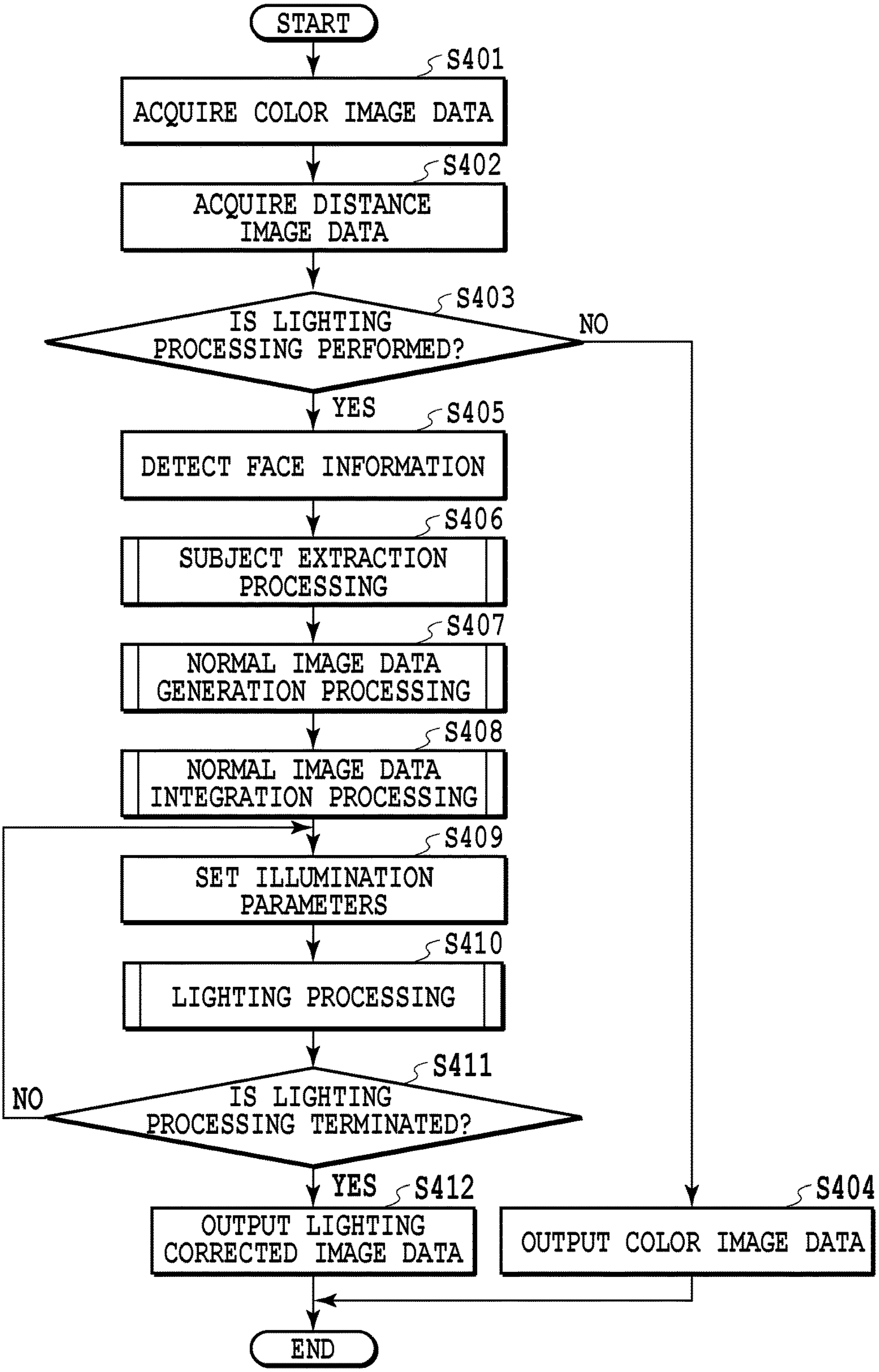
FIG. 4 is a flowchart showing a flow of processing of the image processing unit in the first embodiment.

FIG. 4 is a flowchart showing a flow of processing of the image processing unit 209 in the image processing apparatus of the present embodiment. In the present embodiment, based on face information detected from color image data, a subject area is extracted from distance image data and subject distance image data is generated. Next, a normal vector for each pixel in the subject area is estimated based on the subject distance image data and subject normal image data corresponding to the subject area is generated. Further, face normal image data and face organ normal image data corresponding to the face area and the face organ area, respectively, are generated based on the face information, the face normal model, and the face organ normal model. Then, the subject normal image data, the face normal image data, and the face organ normal image data are integrated and the integrated normal image data corresponding to the pixel arrangement of the color image data is generated. After this, based on the illumination parameters set by the user operation, the subject distance image data, and the integrated normal image data, the lighting processing to add a virtual light source to the color image data is performed and the lighting corrected image data is generated. In the following, details of the processing performed by the image processing unit 209 are described.

Figure 5A:
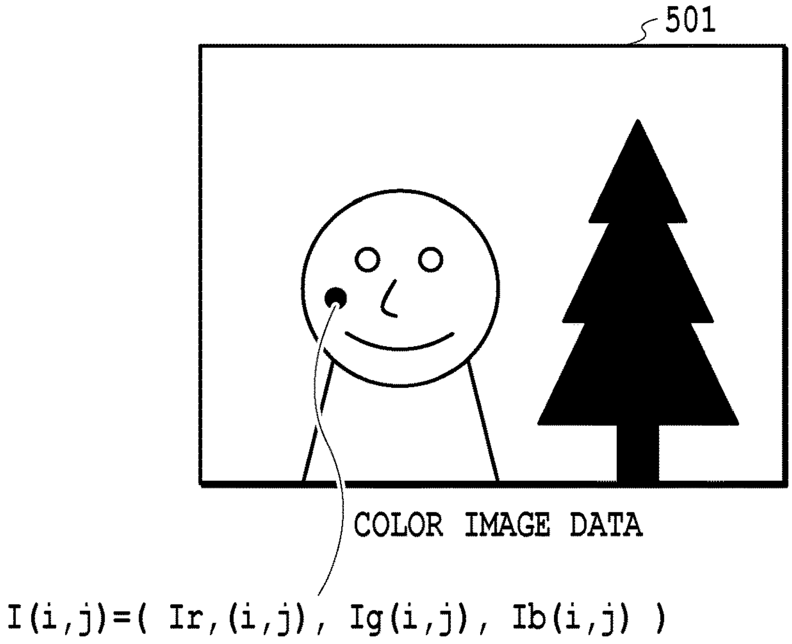
FIG. 5A is a diagram showing an example of color image data in the first embodiment.

At step S401, the development processing unit 301 generates color image data based on the RAW image data acquired from the A/D conversion unit 208. In the present embodiment, the development processing unit 301 generates color image data by performing white balance processing, demosaicking processing, noise reduction processing, color conversion processing, edge enhancement processing and the like for the RAW image data. FIG. 5A shows an example of color image data in the present embodiment. In a pixel (i, j) of color image data 501, RGB values are stored as pixel values and represented as Ir (i, j), Ig (i, j), and Ib (i, j), respectively. The acquisition method of color image data is not limited to this. For example, it may also be possible for the development processing unit 301 to acquire the RAW image data stored in the RAM 204 or the PC/media 213 and to generate color image data. Alternatively, it may also be possible to acquire color image data stored in the RAM 204 or the PC/media 213.

Figure 5B:
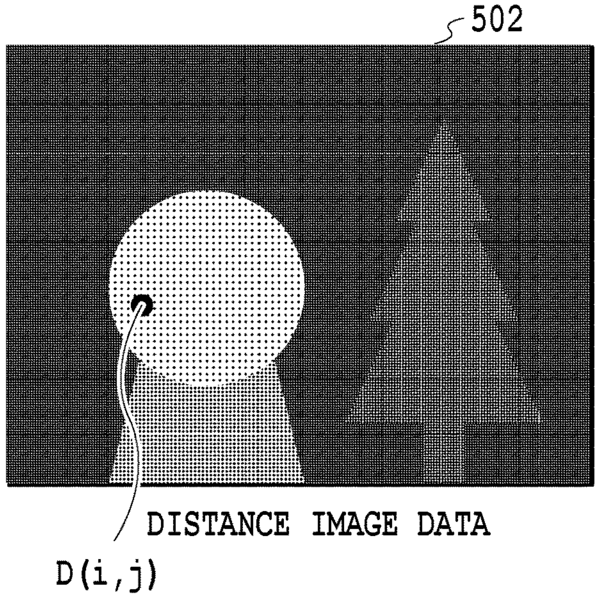
FIG. 5B is a diagram showing an example of distance image data in the first embodiment.

At step S402, the subject extraction unit 303 acquires distance image data from the distance acquisition unit 105. FIG. 5B shows an example of distance image data in the present embodiment. In the pixel (i, j) of distance image data 502, as a pixel value D (i, j), a distance value corresponding to the pixel from the image capturing apparatus to the subject is stored. The acquisition method of distance image data is not limited to this. For example, it may also be possible to acquire distance image data stored in the RAM 204 or the PC/media 213.

At step S403, the lighting processing unit 308 acquires the state of the flag SW1 from the RAM 204. Then, the lighting processing unit 308 performs determination processing to determine whether or not to perform lighting processing based on the state of the flag SW1. In the case where the flag SW1 is OFF, the lighting processing unit 308 determines not to perform lighting processing and the processing advances to step S404. In the case where the flag SW1 is ON, the lighting processing unit 308 determines to perform lighting processing and the processing advances to step S405.

At step S404, the lighting processing unit 308 acquires the state of the flag SW2 from the RAM 204. Then, in the case where the flag SW2 is OFF, the lighting processing unit 308 outputs only the color image data to the PC/media 213 and stores the color image data therein. In the case where the flag SW2 is ON, the lighting processing unit 308 outputs the color image data and the distance image data to the PC/media 213 and records the color image data and the distance image data therein. Further, it is preferable for the lighting processing unit 308 to make it possible for a user to check the image data by outputting and displaying the color image data on the display unit 106. After this, the processing ends.

Figure 6:
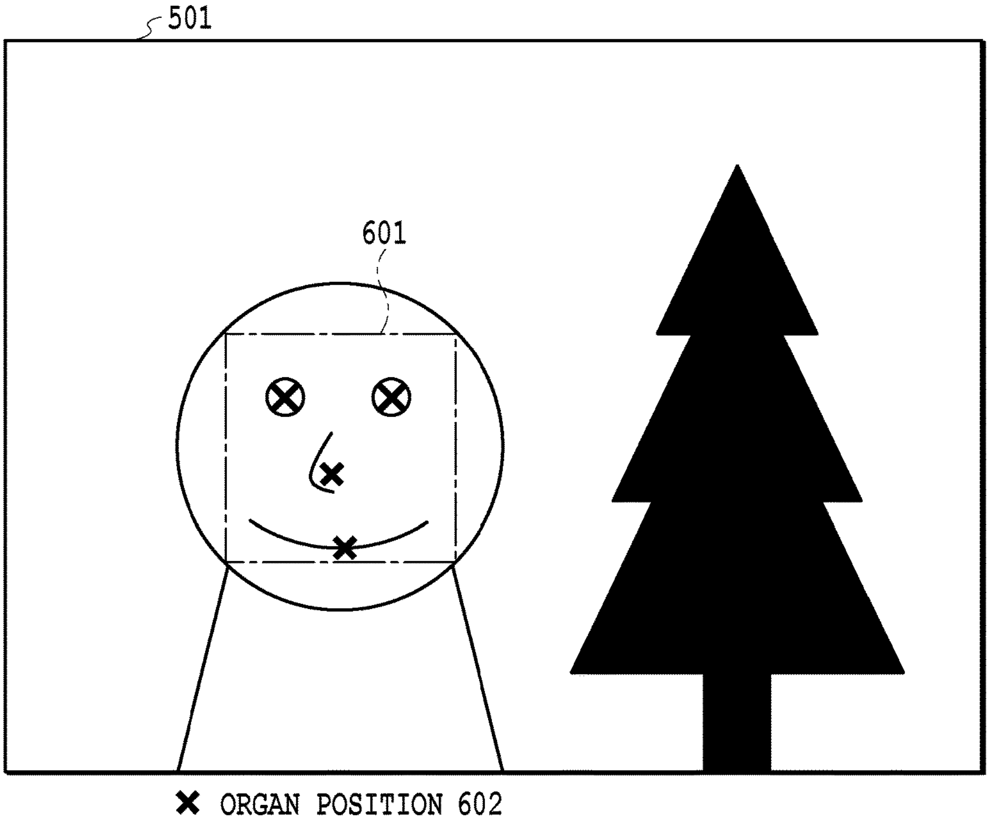
FIG. 6 is a diagram showing an example of face information in the first embodiment.

At step S405, the face detection unit 302 acquires face information by which it is possible to identify the face area from the subject included in the color image data based on the color image data 501. FIG. 6 shows an example of acquired face information. The face information in the present embodiment includes a face area 601 and an organ position 602. The face area 601 is an area including each organ position of the face and for example, extracted as a rectangular area as shown in FIG. 6. The organ position 602 represents coordinates indicating the position of the eye, the nose, the mouth and the like within the face area. It is possible to apply an already-existing algorithm to the extraction method of the face area and the organ position. As an example, mention is made of an algorithm using template matching, an algorithm using the Haar-Like feature amount and the like.

In the present embodiment, by template matching, the face area and the organ position are extracted. First, the face detection unit 302 performs threshold value processing for color image data and extracts a skin-colored area as a face candidate area. Then, the face detection unit 302 performs matching processing for the face candidate area by using face image templates in a variety of sizes and calculates likelihood. Finally, the face detection unit 302 performs determination processing to determine whether or not the face candidate area is a face area based on the likelihood and extracts the face area. The face detection unit 302 performs the same extraction processing for the extracted face area by using the eye, nose, and mouth templates for the organ position. By the above processing, the face area 601 and the organ position 602 are acquired.

At step S406, the subject extraction unit 303 extracts the subject area from the distance image data based on the face area 601 detected by the face detection unit 302 and the color image data and generates subject distance image data corresponding to the subject area. In the case where a plurality of face areas is included, the subject extraction unit 303 selects the face area of the target subject based on a user operation acquired from the control unit 206. Details of the subject extraction processing at this step will be described later.

At step S407, the normal generation unit 304 generates subject normal image data, face normal image data, and face organ normal image data corresponding to the subject area, the face area, and the organ area in the color image data, respectively. The subject normal image data is generated by estimating the normal vector for each pixel of the subject area based on the subject distance image data generated by the subject extraction unit 303. The face normal image data and the face organ normal image data are generated by deforming the face normal model and the face organ normal model acquired from the ROM 203 or the like based on the face information and the color image data. Then, a smoothness degree is set to each piece of normal image data. Details of the normal image data generation processing at this step will be described later.

At step S408, the normal integration unit 305 integrates the subject normal image data, the face normal image data, and the face organ normal image data generated by the normal generation unit 304 and generates integrated normal image data corresponding to the pixel arrangement of the color image data. At this time, based on the smoothness degree set at step S407, the smoothing processing and the integration processing are repeated in the order from the normal image data whose smoothness degree is the highest. Details of the normal image data integration processing at this step will be described later.

At step S409, the illumination parameter setting unit 307 sets illumination parameters based on a user operation acquired from the control unit 206. The illumination parameters in the present embodiment include the position, the pose, the intensity, the light source color and the like of the illumination. Further, in the present embodiment, it is possible for a user to perform an operation to set the illumination parameters while observing a preview image displayed on the display unit 106. The preview image is initialized based on the color image data acquired at step S401 and updated based on the lighting corrected image data generated by the lighting processing at step S410 that follows. Due to this, it is possible for a user to move the illumination to a selected position by, for example, selecting a desired position on the preview image.

At step S410, the lighting processing unit 308 performs lighting processing, such as processing to add a virtual illumination to the color image data, based on the subject distance image data, the integrated normal image data, and the illumination parameters and generates lighting corrected image data. Details of the lighting processing at this step will be described later.

At step S411, the lighting processing unit 308 determines whether to terminate the lighting processing based on a user operation acquired from the control unit 206. Here, the preview image that is displayed on the display unit 106 is updated based on the lighting corrected image data generated at step S410. In the case where a user is satisfied with the updated preview image, the user performs an operation to terminate the lighting processing. In the case where it is determined that the lighting processing is terminated, the processing advances to step S412. In the case where it is determined that the lighting processing is not terminated, the processing returns to step S409 so that the setting of the light source parameters is performed again.

At step S412, the lighting processing unit 308 acquires the state of the flag SW2 from the RAM 204. Then, in the case where the flag SW2 is OFF, the lighting processing unit 308 outputs the lighting corrected image data and the color image data to the PC/media 213 and records them therein. In the case where the flag SW2 is ON, the lighting processing unit 308 outputs the lighting corrected image data, the color image data, and the distance image data to the PC/media 213 and records them therein. After this, the processing ends.

<Subject Extraction Processing>

Figure 7:
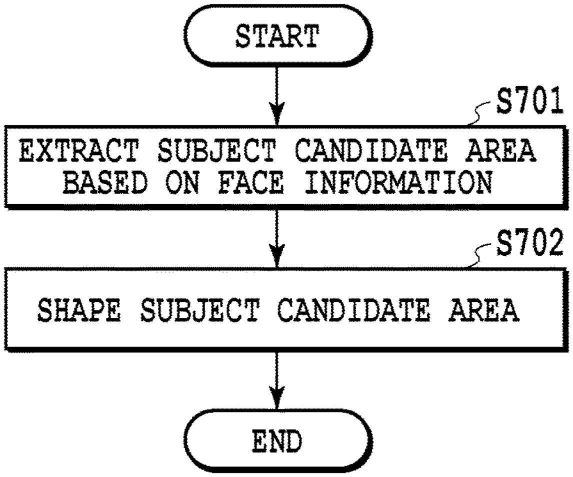
FIG. 7 is a flowchart showing a flow of subject extraction processing in the first embodiment.

Here, the subject extraction processing performed by the subject extraction unit 303 at step S406 is explained. FIG. 7 is a flowchart showing a flow of the subject extraction processing in the present embodiment. The subject extraction processing in the present embodiment generates the subject distance image data in which distance values are stored only in the subject area by extracting a subject candidate area from the distance image data based on the face information and correcting the subject candidate area. In the following, details of the subject extraction processing are described.

Figure 8A:
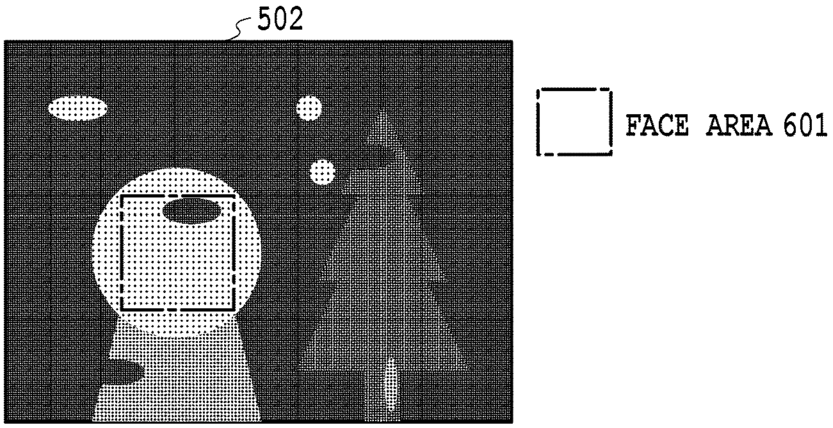
FIGS. 8A to 8C are diagrams showing an outline of the subject extraction processing in the first embodiment.
Figure 8B:
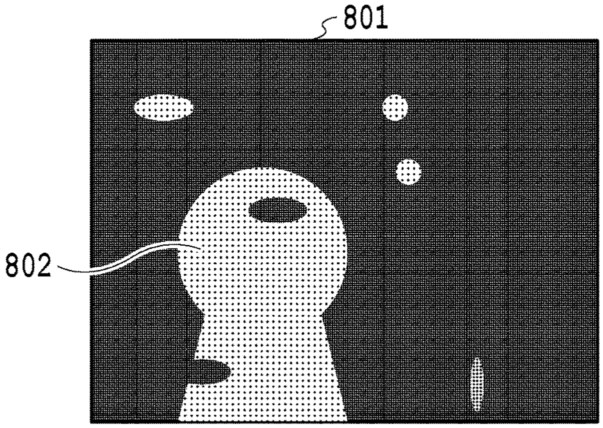

At step S701, the subject extraction unit 303 extracts the subject candidate area from the distance image data based on the face information. With reference to FIG. 8A and FIG. 8B, the processing at this step is explained. First, the subject extraction unit 303 acquires the distance value of each pixel included in the face area 601 from the distance image data 502 as shown in FIG. 8A and calculates the average value of the distance values as a subject face distance value. After this, the subject extraction unit 303 extracts pixels having a distance value close to the subject face distance value by performing threshold value processing for the distance image data. By doing so, the subject extraction unit 303 generates a binary image 801 in which the pixel value in the subject candidate area is 1 and the pixel value in the other area is 0. FIG. 8B shows an example of the generated binary image 801 and a subject candidate area 802 that is extracted.

Figure 8C:
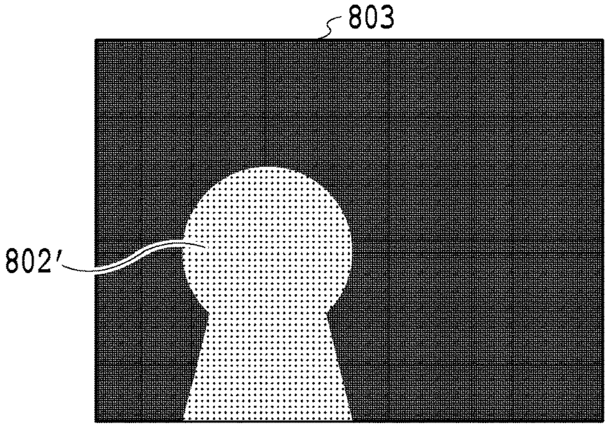

At step S702, the subject extraction unit 303 performs processing to remove small connected components included in the subject candidate area 802 and shaping processing to fill holes by performing small-component removal processing and hole filling processing for the binary image 801. As the small-component removal processing and the hole filling processing, it is possible to apply a method that uses the morphology operation, a method that makes use of labeling processing and the like. Here, the method that uses the morphology operation is made use of. In the small-component removal processing, opening processing is performed for the subject candidate area 802 included in the binary image 801. In the hole filling processing after this, closing processing is performed for the subject candidate area. Due to this, a binary image 803 in which the pixel value in the subject area is 1 and the pixel value in the other area (background area) is 0 is generated. FIG. 8C shows an example of the generated binary image 803 and a subject area 802'. Then, based on the binary image 803, subject distance image data 804 corresponding to the subject area 802' is extracted from the distance image data 502. By the above processing, the image is divided into the subject that occupies the front mainly and the other background and the subject distance image data in which distance values are stored only in the subject area is acquired.

<Normal Image Data Generation Processing>

Figure 9:
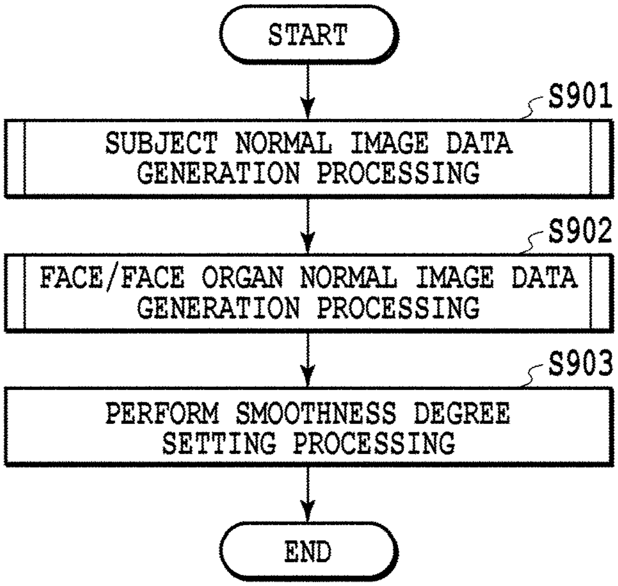
FIG. 9 is a flowchart showing a flow of normal image data generation processing in the first embodiment.

Here, the normal image data generation processing that is performed by the normal generation unit 304 at step S407 is explained. The normal image data generation processing in the present embodiment generates the subject normal image data, the face normal image data, and the face organ normal image data corresponding to the subject area, the face area, and the face organ area, respectively, in the color image data. FIG. 9 is a flowchart showing a flow of the normal image data generation processing in the present embodiment.

At step S901, the normal generation unit 304 estimates the normal vector for each pixel in the subject area based on the subject distance image data generated by the subject extraction unit 303 and generates the subject normal image data corresponding to the subject area. The normal generation unit 304 estimates the normal vector for each pixel in the subject area in accordance with the subject area (boundary between the background and the subject) viewed from the image capturing apparatus. Details of the normal image data generation processing for the subject area at this step will be described later.

At step S902, the normal generation unit 304 acquires the face normal model and the face organ normal model from the ROM 203 or the like. Then, the normal generation unit 304 generates the face normal image data and the face organ normal image data by deforming the face normal model and the face organ normal model, respectively, based on the face information and the color image data. Details of the normal image data generation processing for the face and face organ areas at this step will be described later.

At step S903, the normal generation unit 304 sets a smoothness degree to the subject normal image data, the face normal image data, and the face organ normal image data. Here, a lower smoothness degree is set to the normal image data whose deviation in shape from the shape of the subject in the image is smaller and whose deviation in position is smaller. A high smoothness degree is set to the normal image data whose deviation in shape from the shape of the subject is large or to the normal image data whose positioning with the subject is difficult. In the smoothing processing that is performed later, it is possible to change the intensity of the smoothing processing by changing the filter size based on the set smoothness degree. In the present embodiment, the normal information on the subject area is generated based on the subject area extracted from the distance information and the normal information represents a rough shape of the subject. Because of this, compared to the normal image data generated based on the model, the deviation in shape is large. Further, from the face area of the subject and the face organ area of the subject, each piece of normal image data is generated based on the respective models. At this time, the smaller the target area (parts) that serves as a model, the smaller the deviation in position from the subject is. For example, for the normal image data generated based on the face normal model that models the face, positioning between the subject and the model is performed based on the position information on the face organ of the entire face area. Because of this, in the area other than the face organ, such as the area of the contour of the face, a deviation in position from the subject tends to occur. On the other hand, for the normal image data generated based on the normal model that models the eye, in the area extracted as the eye, positioning with the eye of the actual subject is easily performed. Consequently, in the present embodiment, the smoothness degree is set in three steps: high, medium, and low. The smoothness degree of the subject normal image data in the present embodiment is set to high. The smoothness degree of the face normal image data in the present embodiment is set to medium. The smoothness degree of the face organ normal image data in the present embodiment is set to low.

<<Normal Image Data Generation Processing for Subject Area>>

Figure 10:
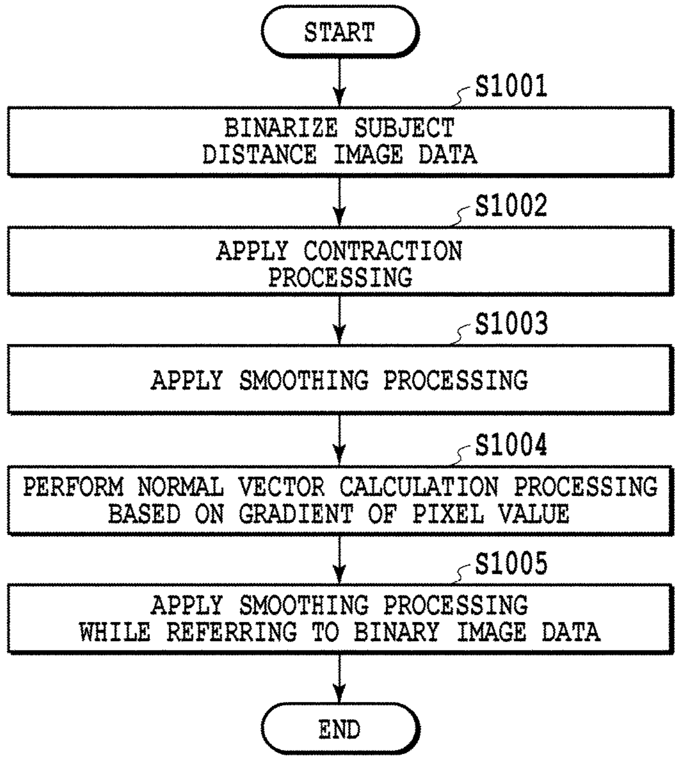
FIG. 10 is a flowchart showing a flow of the normal image data generation processing for a subject area in the first embodiment.

Here, details of the normal image data generation processing for the subject area that is performed by the normal generation unit 304 at step S901 are explained. The normal image data generation processing for the subject area in the present embodiment generates the subject normal image data corresponding to the subject area based on the subject distance image data. FIG. 10 shows a flow of the normal image data generation processing for the subject area.

Figure 11A:
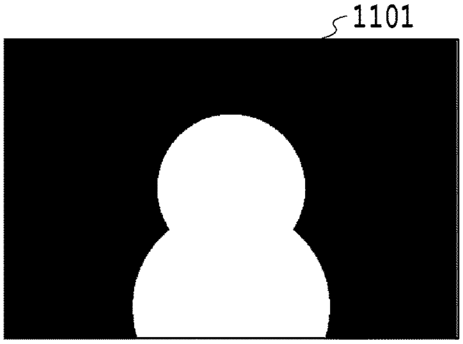
FIGS. 11A to 11E are diagrams showing an outline of the normal image data generation processing for the subject area in the first embodiment.

At step S1001, the normal generation unit 304 generates binary image data 1101 including the subject area and the background area by performing the threshold value processing for the subject distance image data 804. For example, it is sufficient for the binary image data 1101 in which the pixel value in the subject area is 255 and the pixel value in the background area is 0 to be generated. FIG. 11A shows an example of the binary image data 1101 generated at this step.

Figure 11B:
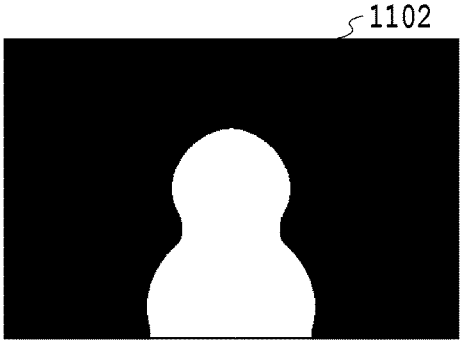

At step S1002, the normal generation unit 304 applies contraction processing to the binary image data 1101 generated at step S1001. For example, it is sufficient to set the pixel values of the pixel whose distance from the background is less than or equal to r1 of the subject area to 0 by Erosion. FIG. 11B shows an example of binary image data 1102 to which the contraction processing has been applied.

Figure 11C:
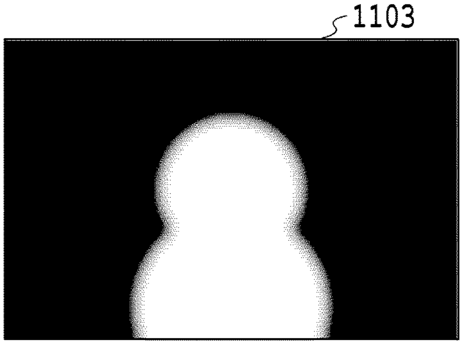

At step S1003, the normal generation unit 304 applies the smoothing processing to the binary image data 1102 to which the contraction processing has been applied at step S1002. For example, it is sufficient to apply a Gaussian filter with a radius r2 or the like. FIG. 11C shows an example of image data 1103 to which the smoothing processing has been applied.

At step S1004, the normal generation unit 304 calculates the normal vector for each pixel based on the image data 1103 to which the smoothing processing has been applied at step S1003. Here, the pixel value of the image data 1103 is handled as the distance value and based on the distance value and the two-dimensional coordinate values of the pixel of the image data 1103, three-dimensional coordinate values are calculated for each pixel. Then, based on the three-dimensional coordinate values, the corresponding normal vector is estimated for each pixel. As the estimation method of a normal vector, it is possible to apply a method of calculating a normal vector based on the gradient calculated from the three-dimensional coordinate values, a method in which a plane is fit for each pixel and the normal to the plane is taken to be a normal vector and the like. In the present embodiment, the vector vertical to the plane fit to the area in the vicinity of the pixel of interest is calculated as a normal vector. The procedure is described below.

The three-dimensional coordinate values of the pixel of interest for which a normal vector is calculated and pixels in the vicinity of the pixel of interest are taken to be $(x_0, y_0, z_0), \ldots, (x_{n-1}, y_{n-1}, z_{n-1})$. The x-coordinate value is obtained based on the horizontal direction coordinate value of the two-dimensional coordinate values of the image data 1103 and the y-coordinate value is obtained based on the vertical direction coordinate value of the two-dimensional coordinate values of the image data 1103. Further, the z-coordinate value is obtained based on the pixel value of the image data 1103. To these coordinate values, a plane ax+by+c=z is fit. Specifically, by making use of the distance in the z-axis direction, parameters a, b, and c that minimize a function expressed by expression (1) below are obtained.

$$E=\Sigma_i(ax_i+by_i+c-z_i)^2 \qquad \text{expression (1)}$$

At this time, the parameters a, b, and c are calculated by expression (2) below.

$$\begin{bmatrix} a \\ b \\ c \end{bmatrix} = \begin{bmatrix} \Sigma_i x_i^2 & \Sigma_i x_i y_i & \Sigma_i x_i \\ \Sigma_i x_i y_i & \Sigma_i x_i^2 & \Sigma_i y_i \\ \Sigma_i x_i & \Sigma_i y_i & n \end{bmatrix}^{-1} \begin{bmatrix} \Sigma_i x_i z_i \\ \Sigma_i y_i z_i \\ \Sigma_i z_i \end{bmatrix} \qquad \text{expression (2)}$$

Further, a vector $n=(n_x, n_y, n_z)$ vertical to the plane ax+by+c=z is calculated as expression (3) below.

$$n_x = \frac{a}{\sqrt{a^2 + b^2 + 1}}$$
$$n_y = \frac{b}{\sqrt{a^2 + b^2 + 1}}$$
$$n_z = \frac{-1}{\sqrt{a^2 + b^2 + 1}} \quad \text{expression (3)}$$

Figure 11D:
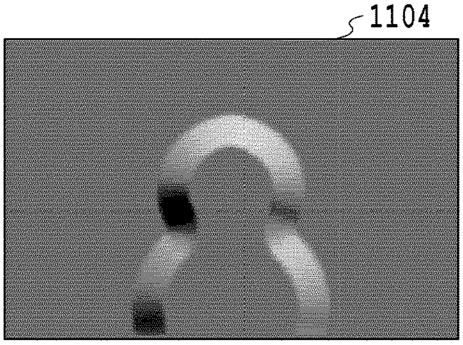

The vector calculated above is taken to be the normal vector corresponding to the pixel of interest. By performing the same processing for each pixel of the image data 1103 to obtain the normal vector for the pixel in the image data, normal image data 1104 is generated. The normal image data is image data storing a normal vector ($n_x$ (i, j), $n_y$ (i, j), $n_z$ (i, j)) in the pixel (i, j). FIG. 11D shows an example of the calculated normal image data 1104.

Figure 11E:
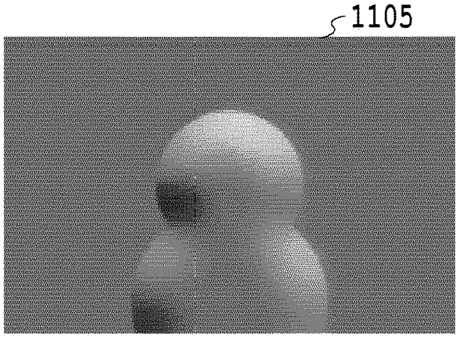

At step S1005, the normal generation unit 304 applies the smoothing processing to the normal image data 1104 generated at step S1004 while referring to the binary image data 1101 calculated at step S1001. For example, as the smoothing processing, it is possible to apply a joint bilateral filter that takes the binary image data 1101 to be a reference image. After the smoothing processing has been applied, normalization is performed so that the magnitude of the normal vector becomes 1 for each pixel. By the above processing, subject normal image data 1105 is generated. FIG. 11E shows an example of the generated subject normal image data 1105.

It is desirable to set the radius r2 used at step S1003 to the same value as or close to the value of the radius r1 used at step S1002. By doing so, it is possible to give the normal vector with an inclination only to the subject area.

<<Normal Image Data Generation Processing for Face and Face Organ Areas>>

Figure 12:
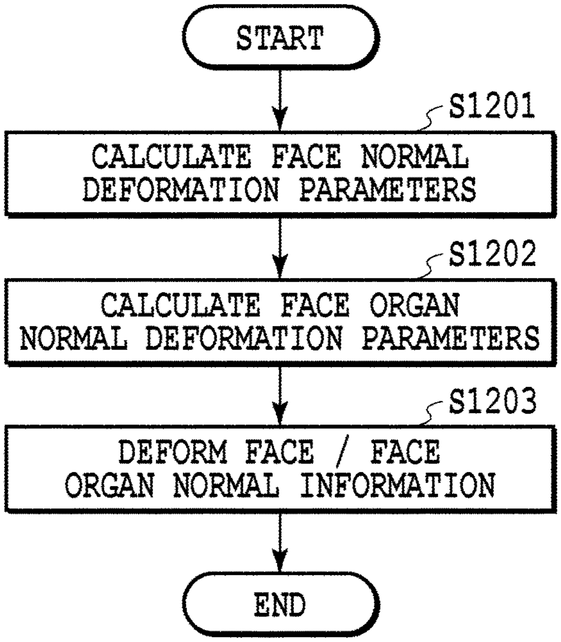
FIG. 12 is a flowchart showing an outline of the normal image data generation processing for a face/face organ area in the first embodiment.

Here, details of the normal image data generation processing for the face and face organ areas performed by the normal generation unit 304 at step S902 are explained. The normal image data generation processing for the face and face organ areas in the present embodiment generates the face normal image data and the face organ normal image data by deforming the face normal model and the face organ normal model based on the face information and the color image data. FIG. 12 shows a flow of the normal image data generation processing for the face and face organ areas.

At step S1201, the normal generation unit 304 calculates face deformation parameters to deform the face normal model in accordance with the subject in the color image data. The deformation parameters are obtained based on the organ position 602 of the subject included in the color image data and the face normal organ position included in the face normal model.

Figure 13A:
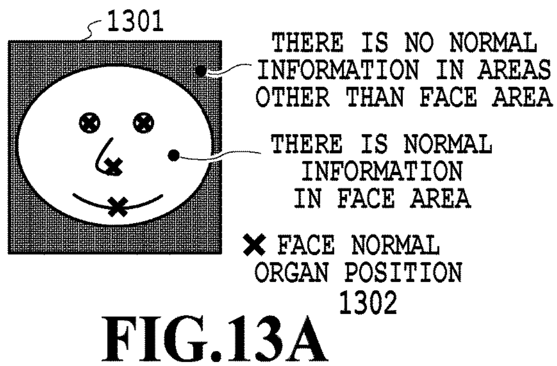
FIGS. 13A to 13C are diagrams showing an outline of the normal image data generation processing for the face/face organ area in the first embodiment.
Figure 13B:
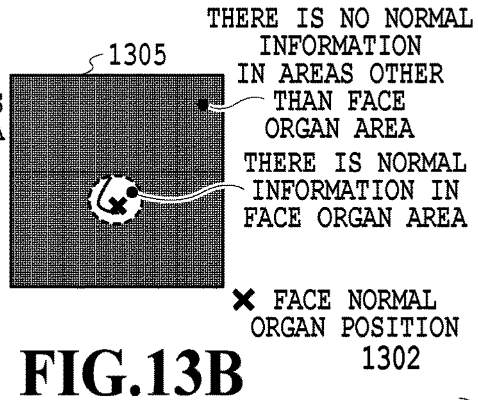

FIG. 13A shows an example of the face normal model and the face normal organ position in the present embodiment. A face normal model 1301 is image data having normal information on the face created based on a common face shape as a pixel value. In the pixel (i, j) corresponding to the face, each component of the normal vector is stored as the pixel value. In the pixel not corresponding to the face, a value indicating that there is no normal vector is stored. Due to this, it is possible to determine whether the area is the face area or an area other than the face area based on the pixel value. Further, the face normal model 1301 has also a face normal organ position 1302 corresponding to the face organ, such as the eye, the nose, and the mouth. As the deformation method of a face normal model, it is possible to apply affine transformation, projection transformation and the like. In the present embodiment, by the affine transformation expressed by expression (4) below, the face normal model 1301 is deformed.

$$x = a_0 x + a_1 y + a_2$$
$$y = a_3 x + a_4 y + a_5 \quad \text{expression (4)}$$

It is possible to calculate deformation parameters ($a_0$, $a_1$, $a_2$, $a_3$, $a_4$, $a_5$) by associating the coordinates of the organ positions 602 with the coordinates of the right eye, the left eye, the nose, and the mouth at the face normal organ positions, and making use of the least squares method or the like. By the above processing, the face deformation parameters to deform the face normal model are acquired.

Figure 13C:
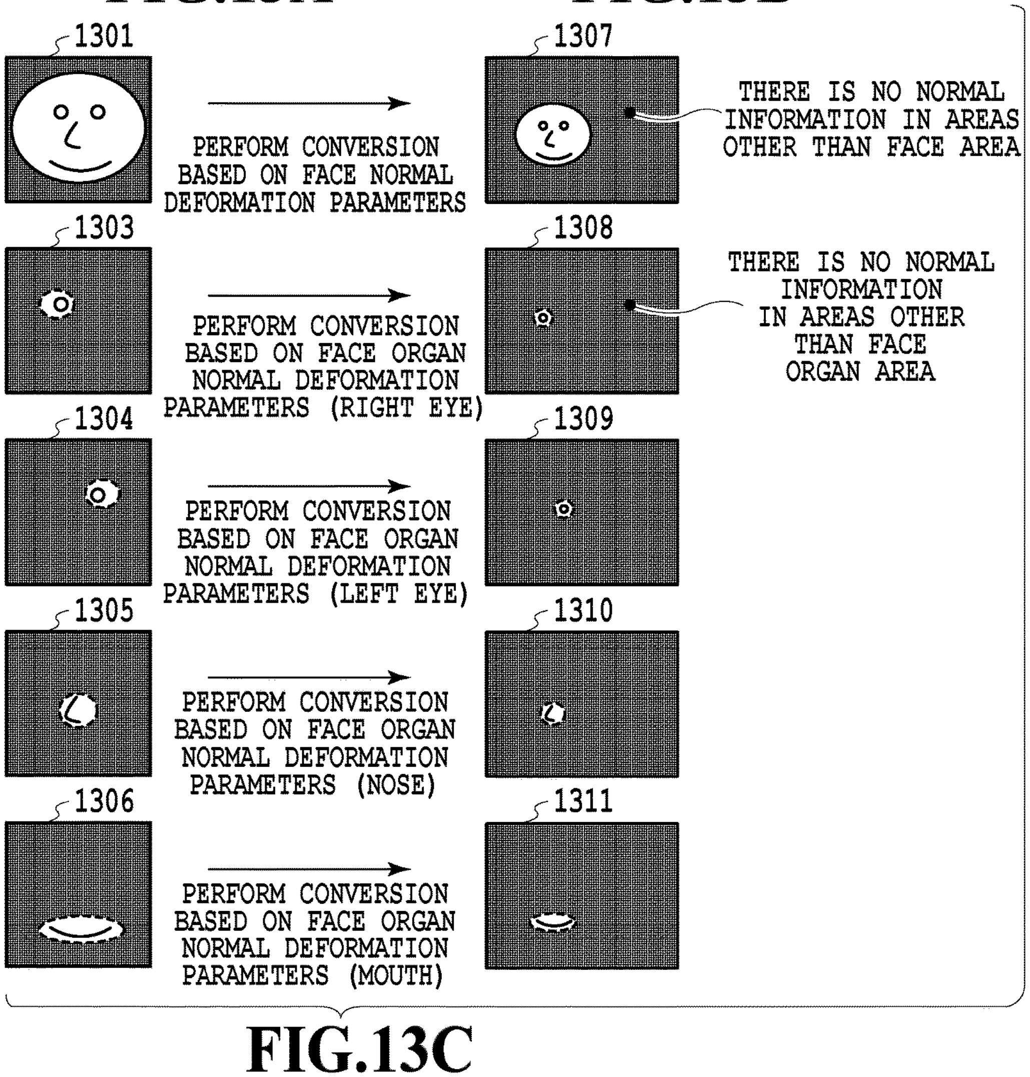

At step S1202, the normal generation unit 304 calculates face organ deformation parameters to deform the face organ normal model in accordance with the subject in the color image data. FIG. 13C shows an example of the face organ normal model. The face organ normal model is image data having normal information on only the face organ area as a pixel value. In the present embodiments, face organ normal models 1303, 1304, 1305, and 1306 correspond to the right eye, the left eye, the nose, and the mouth, respectively. Further, it is assumed that the image size of the face organ normal model is the same as the image size of the face normal model and the face organ area is the peripheral area of the face normal organ position 1302.

The face organ deformation parameters to deform the face organ normal model are calculated by correcting the face deformation parameters calculated at step S1201 based on the organ position 602 and the face normal organ position 1302. Specifically, the parameters $a_2$ and $a_5$ that are translation components of the face deformation parameters are corrected so that the face normal organ position 1302 after deformation coincides with the organ position 602, and thereby, parameters $a'_2$ and $a'_5$ are calculated. The face organ normal model is deformed in accordance with expression (5) below using corrected deformation parameters ($a_0$, $a_1$, $a'_2$, $a_3$, $a_4$, $a'_5$).

$$x' = a_0 x + a_1 y + a'_2$$
$$y' = a_3 x + a_4 y + a'_5 \quad \text{expression (5)}$$

By performing the above processing for each face organ of the right eye, the left eye, the nose, and the mouth, the face organ deformation parameters corresponding to each face organ normal model are acquired. The arrangement of the eye, the nose, and the mouth is somewhat different depending on the subject because of the age, sex, individual difference and the like. By performing positioning while changing the deformation parameters for each face organ as in the present embodiment, it is possible to fit the normal information into the correct organ position for a variety of subjects.

At step S1203, the normal generation unit 304 generates the face normal image data by deforming the face normal model based on the face deformation parameters. Further, the normal generation unit 304 generates the face organ normal image data by deforming the face organ normal model based on the face organ deformation parameters. By deforming the face normal model 1301 and the face organ normal models 1303 to 1306 as shown in FIG. 13C, face normal image data 1307 and face organ normal image data 1308 to 1311 are generated. In the face normal image data 1307, a value indicating that there is no normal information in the areas other than the face area is stored as a pixel value.

In the face organ normal image data 1308 to 1311, a value indicating that there is no normal information in the areas other than the face organ area is stored as a pixel value.

<Normal Image Data Integration Processing>

Figure 14:
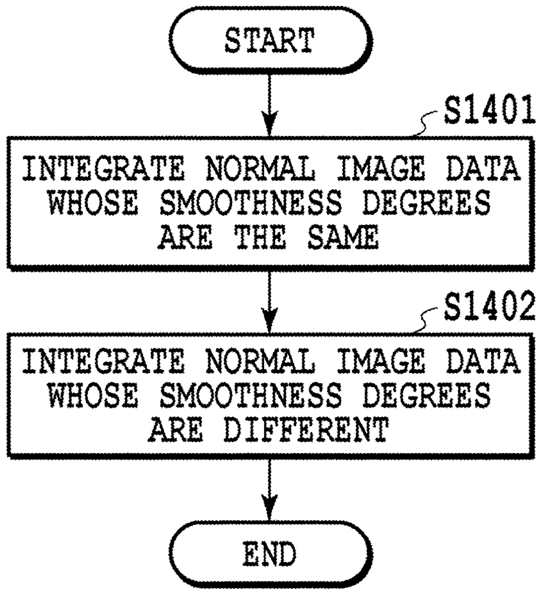
FIG. 14 is a flowchart showing a flow of normal image data integration processing in the first embodiment.

Here, the normal image data integration processing that is performed by the normal integration unit 305 at step S408 is explained. The normal image data integration processing in the present embodiment generates the integrated normal image data corresponding to the pixel arrangement of the color image data by integrating the subject normal image data, the face normal image data, and the face organ normal image data acquired by the normal integration unit 305 from the normal generation unit 304. Further, in the present embodiment, based on the smoothness degree of each piece of normal image data, the normal image data integration processing is performed separately a plurality of times. FIG. 14 is a flowchart showing a flow of the normal image data integration processing.

At step S1401, the normal integration unit 305 integrates the normal image data whose smoothness degrees are the same. In the present embodiment, what is obtained by integrating the normal image data whose smoothness degrees are high is high-smoothness degree normal image data 1501. Further, what is obtained by integrating the normal image data whose smoothness degrees are medium is medium-smoothness degree normal image data 1502. Furthermore, what is obtained by integrating the normal image data whose smoothness degrees are low is low-smoothness degree normal image data 1503.

Figure 15:
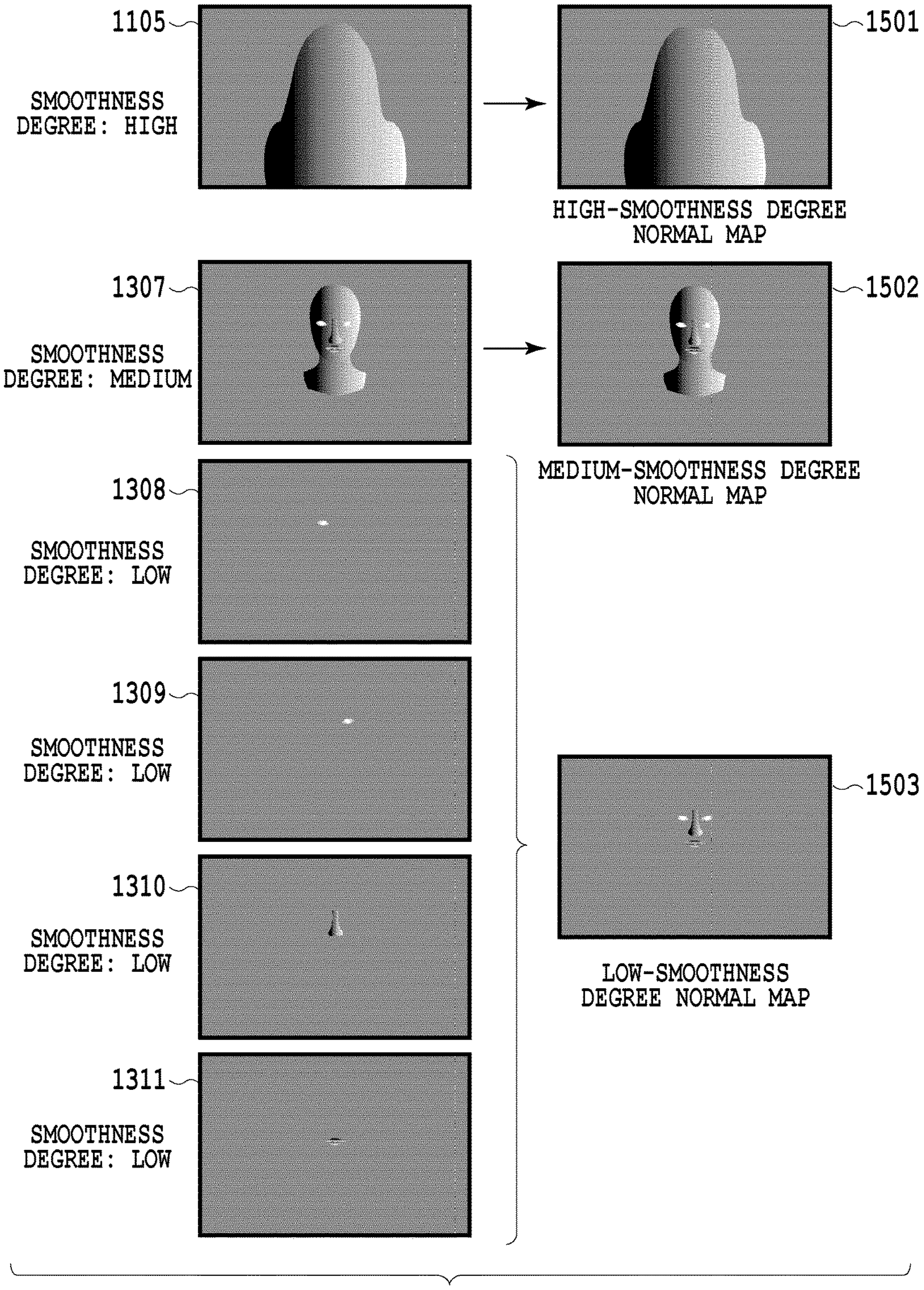
FIG. 15 is a diagram showing an outline of the normal image data integration processing in the first embodiment.

FIG. 15 shows a specific example of the processing at step S1401. In the present embodiment, the data whose smoothness degree is high is only the subject normal image data 1105 and the data whose smoothness degree is medium is only the face normal image data 1307. Because of this, the subject normal image data 1105 is taken to be the high-smoothness degree normal image data 1501 and the face normal image data 1307 is taken to be the medium-smoothness degree normal image data 1502. The data whose smoothness degree is low is the plurality of pieces of face organ normal image data 1309 to 1311, and therefore, the face organ normal image data 1309 to 1311 are integrated and taken to be the low-smoothness degree normal image data 1503. In the integration processing, each piece of normal image data is referred to for each pixel and in the case where normal information is acquired from any of the normal image data, the normal information is taken to be the normal information on the low-smoothness degree normal image data 1503. In the case where normal information exists in two or more pieces of normal image data, the normal information on the normal image data with high priority is employed. In the present embodiment, it is assumed that the priority of each piece of normal image data is in the order of the nose, the mouth, the right eye, and the left eye. The pixel having no normal information in any of the normal image data is taken to be a pixel having no normal information also in the low-smoothness degree normal image data 1503.

At step S1402, the normal integration unit 305 integrates a plurality of pieces of normal image data whose smoothness degrees are different obtained by the processing at step S1401. In the present embodiment, the smoothing processing and the integration processing are repeated for the normal image data in the order from the normal image data whose smoothness degree is the highest. At this time, each piece of normal image data is referred to for each pixel and in the case where the normal information exists in two or more pieces of normal image data, the normal information on the normal image data whose smoothness degree is relatively low is employed. Further, as the smoothing processing, it is sufficient to apply a joint bilateral filter or the like that takes the color image data 501 to be a reference image to the normal image data of interest. Due to this, it is possible to cause the normal image data of interest to adapt to the color image data along the edge thereof. At this time, by changing the filter size in accordance with the smoothness degree of the normal image data, the intensity of the smoothing processing is changed. The normal image data whose smoothness degree is high is smoothed with high intensity and the concavity/convexity of the normal vector is eliminated. On the contrary, the normal image data whose smoothness degree is low is smoothed with low intensity, and therefore, the feeling of concavity/convexity of the normal vector is preserved. The more the normal image data deviates from the shape of the subject whose image is being captured, the higher intensity with which the normal image data is smoothed and the concavity/convexity is eliminated, and therefore, the detrimental influence may be made small in the subsequent lighting processing.

Figure 16:
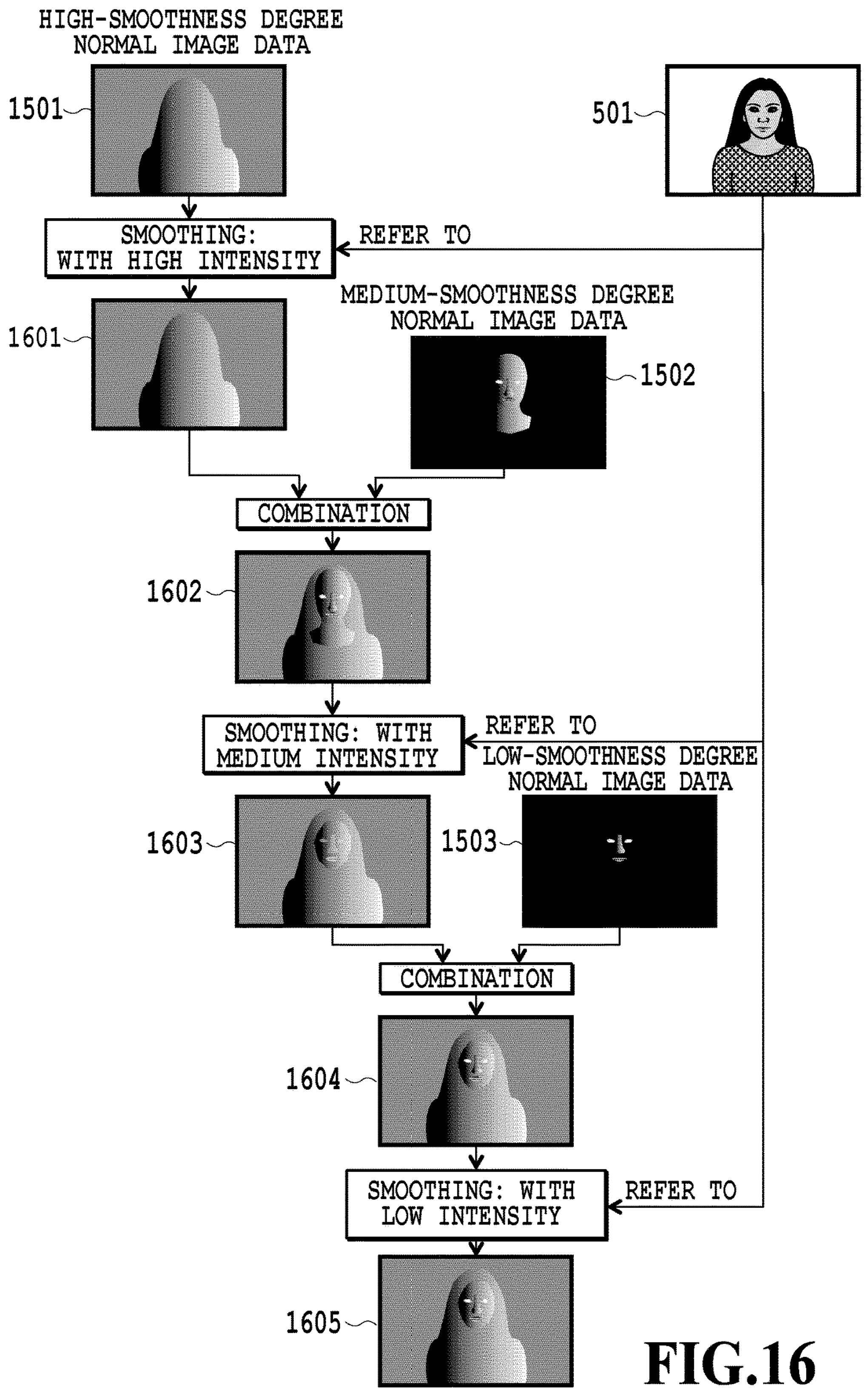
FIG. 16 is a diagram showing an outline of processing to integrate normal image data with different smoothness degrees in the first embodiment.

FIG. 16 shows a specific example of the processing at step S1402. In the present embodiment, the high-smoothness degree normal image data 1501, the medium-smoothness degree normal image data 1502, and the low-smoothness degree normal image data 1503 are integrated. First, for the high-smoothness degree normal image data 1501, the smoothing processing is performed with a large-sized filter. After the smoothing processing is applied, normalization is performed for each pixel so that the magnitude of the normal vector becomes 1. Due to this, normal image data 1601 is obtained. Hereinafter, unless explained in particular, normalization is performed for each pixel so that the magnitude of the normal vector becomes 1 after the smoothing processing is applied to the normal image data.

Next, the normal image data 1601 having been smoothed with a large-sized filter and the medium-smoothness degree normal image data 1502 are integrated and normal image data 1602 is generated. The integration processing is performed by overwriting the pixel value of a pixel with normal information of the medium-smoothness degree normal image data 1502 to the normal image data 1601. In the present embodiment, the normal information on the face area is overwritten to the normal information on the subject area. Then, the smoothing processing is performed with a medium-sized filter for the normal image data 1601, the results of the integration, and normal image data 1603 is obtained.

Further, the normal image data 1603 having been smoothed with a medium-sized filter and the low-smoothness degree normal image data 1503 are integrated and normal image data 1604 is obtained. In the present embodiment, the normal information on the face organ area is overwritten to the normal information on the subject area and the face area. The smoothing processing is performed with a small-sized filter for the normal image data 1604, the results of the integration, and integrated normal image data 1605 is obtained. By the above processing, the integrated normal image data 1605 is obtained in which the subject area, the face area, and the face organ area have been smoothed with the highest intensity, with the second highest intensity, and the third highest intensity, respectively. Because of this, in the subsequent lighting processing, the feeling of difference due to the concavity/convexity of the normal vector may be lessened in the subject area and the like, while the feeling of concavity/convexity is enhanced based on the normal vector in the face organ area.

<Lighting Processing>

Figure 17:
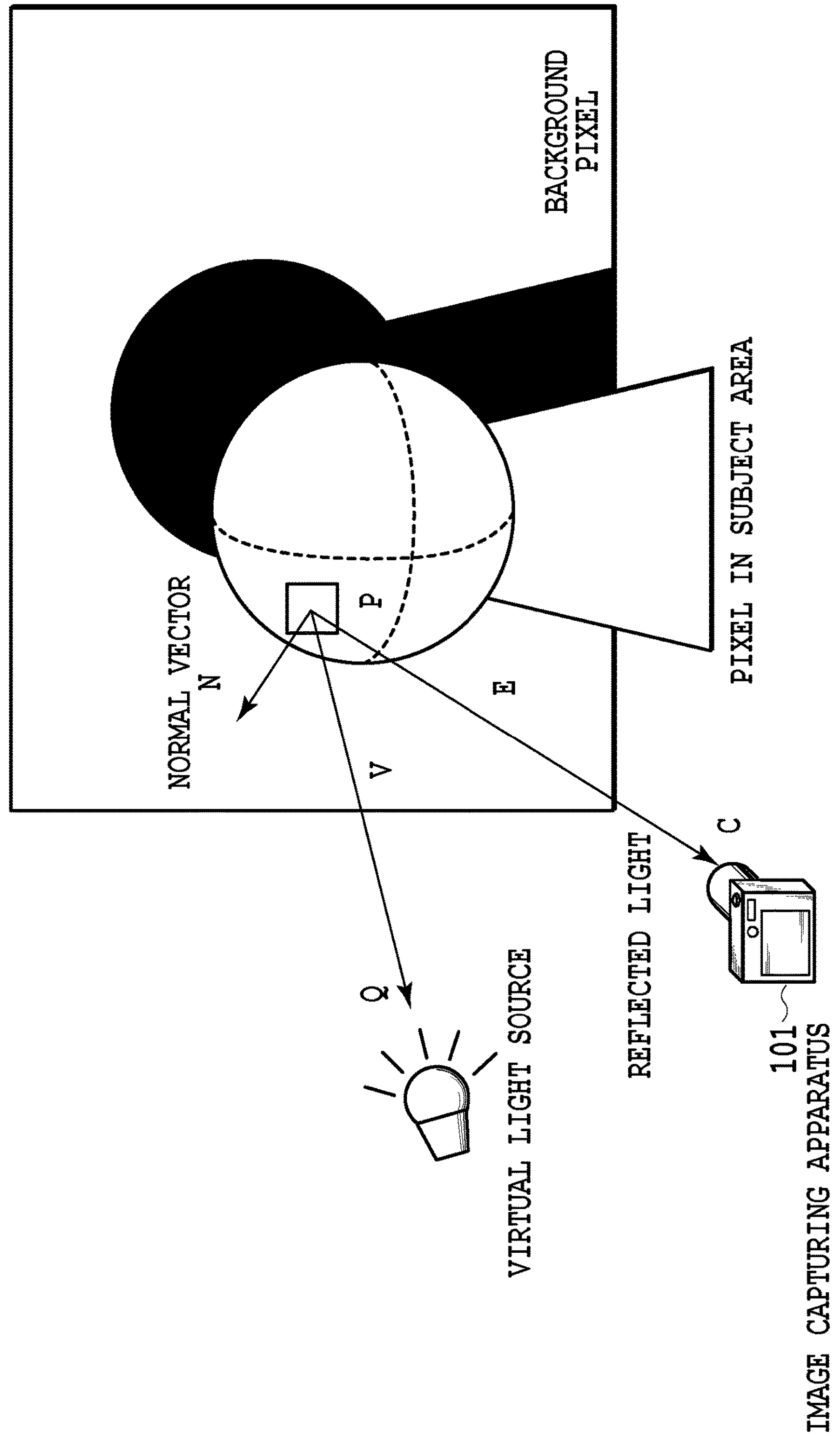
FIG. 17 is a diagram showing an outline of lighting processing in the first embodiment.

Here, the lighting processing that is performed at step S410 is explained. The lighting processing in the present embodiment generates the lighting corrected image data by adding a virtual light source to the color image data based on the subject distance image data, the integrated normal image data, and the illumination parameters set by a user operation. FIG. 17 shows an outline of the lighting processing. In the present embodiment, as the illumination parameters, position Q, pose U, intensity α, and light source color L are set and the lighting corrected image data is generated in accordance with expression (6) below.

$$I'_r(i,j) = I_r(i,j) + \sum_m k_m(i,j) L_{r,m} I_r(i,j) \qquad \text{expression (6)}$$

$$I'_g(i,j) = I_g(i,j) + \sum_m k_m(i,j) L_{g,m} I_r(i,j)$$

$$I'_b(i,j) = I_b(i,j) + \sum_m k_m(i,j) L_{b,m} I_r(i,j)$$

Here, pixel values $I'_r$, $I'_g$, and $I'_b$ represent pixel values of corrected image data I'. Light source colors $L_{r,m}$, $L_{g,m}$, and $L_{b,m}$ represent colors of the mth illumination. A correction degree $k_m$ represents a correction degree for the mth illumination. Further, the correction degree $k_m$ is determined based on the brightness of illumination α, the position of the virtual light source Q, the pose U, the distance value corresponding to the pixel (i, J), and a normal vector N and for example, obtained as expression (7) below.

$$k(i,j) = t\alpha K(\rho)\frac{V(i,j)\cdot N(i,j)}{W(P(i,j),Q)} \qquad \text{expression (7)}$$

Expression (7) is explained with reference to FIG. 17. A correction coefficient t is a correction coefficient to adjust the correction degree by the virtual light source. In the present embodiment, it is assumed that the correction coefficient t=1. The variable α is a variable indicating the brightness of illumination. The vector Q is a vector indicating the position of the virtual light source.

P (i, j) is a vector indicating a three-dimensional position of a point on a subject corresponding to the pixel (i, j) and calculated as below from the subject distance image data 804. First, by reading the pixel value of the pixel (i, j) in the subject distance image data 804, the distance value from the image capturing apparatus 101 to the point on the subject corresponding to the pixel (i, j) is acquired. Subsequently, based on the acquired distance value, the angle of view of the image capturing apparatus 101, the image size of the color image data 501 and the like, the three-dimensional position P (i, j) of the point on the subject corresponding to the pixel (i, j) is calculated.

A function W is a function that returns a greater value as the distance from the position (i, j) on the subject corresponding to the pixel (i, j) to the position of the virtual light source Q increases. An angle ρ indicates an angle formed by a vector from the position of the virtual light source Q toward the position P (i, j) and the pose of illumination U. A function K is a function whose value becomes greater as the angle ρ becomes smaller. The normal vector N (i, j) is a normal vector corresponding to the pixel (i, j) and the pixel value of the integrated normal image data is used. A unit vector V (i, j) is a unit vector indicating the direction from the position P (i, j) toward the position of the virtual light source Q.

Figure 18:
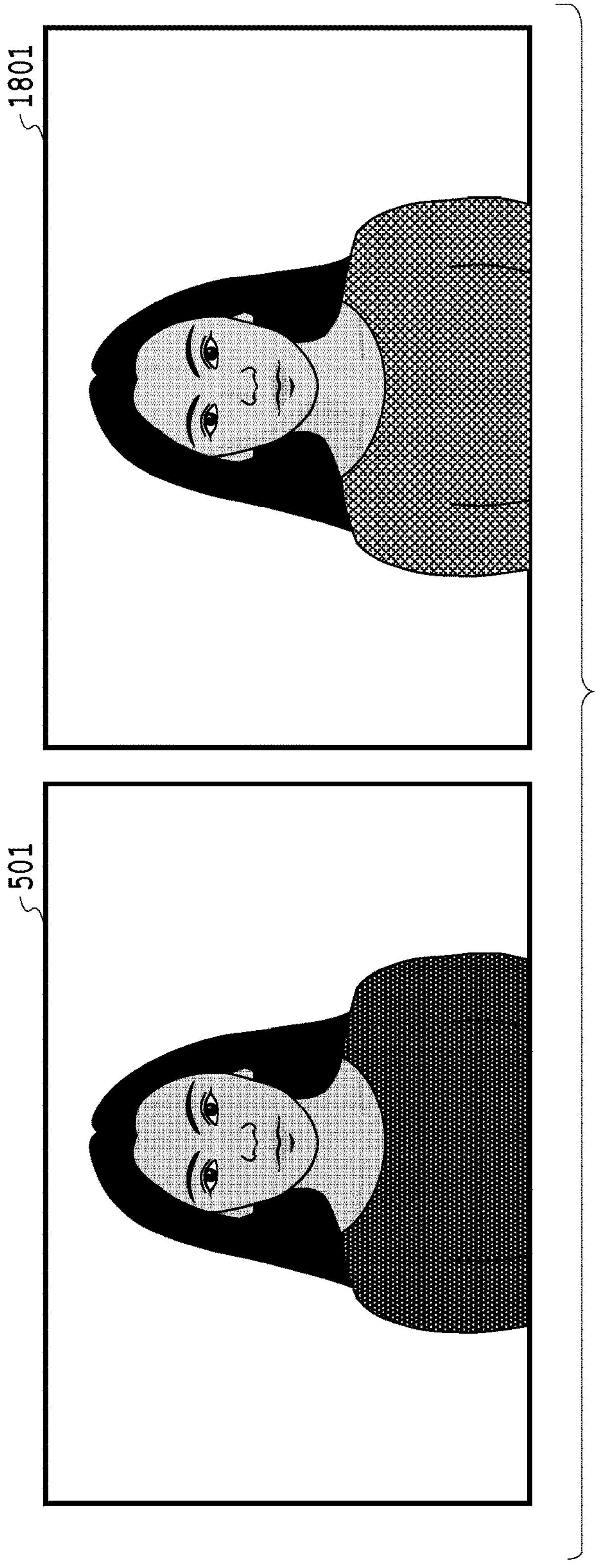
FIG. 18 is a diagram showing an effect of the lighting processing in the first embodiment.

As in the present embodiment, by generating the lighting corrected image data, it is possible to correct the brightness in accordance with the position of illumination and the shape of the subject. That is, correction may be performed so that the pixel closer to the virtual illumination and whose angle formed by the vector from the virtual light source toward the point on the subject corresponding to the pixel (i, j) and the normal vector is smaller, the pixel becomes brighter. Due to this, as shown in FIG. 18, it is possible to correct the color image data 501 into lighting corrected image data 1801 that seems to be obtained by illuminating the subject by a virtual illumination. Further, in the lighting corrected image data 1801, the face organ area whose smoothness degree is lower is more shaded in three dimensions in accordance with the shape of the subject.

As above, in the present embodiment, the subject area, the face area, and the face organ area (a plurality of areas at least part of which is different from one another) in the color image data are extracted and the normal image data is generated for each of the extracted areas. At this time, for the subject area, the normal image data is generated based on the distance image data, for the face area and the face organ area, the normal image data is generated by separately using a plurality of normal models whose smoothness degrees are different. Then, the generated normal image data is integrated and the integrated normal image data used for the lighting correction processing is generated. Due to this, it is not necessary to acquire detailed shape information on a subject or to prepare in advance a very large number of 3D models and a natural image that seems to have been captured under a desired illumination condition may be generated from a captured image.

In the present embodiment, the image size of the face normal model 1301 and that of the face organ normal models 1303 to 1306 are equal to each other, but the image size is not limited to this. For example, among the face organ normal models 1303 to 1306, only the rectangular areas including a pixel with normal information may be stored as image data. Alternatively, the face normal model 1301 may be reduced and stored with a resolution lower than that of the face organ normal model. The smoothness degree of the face normal image data is higher than that of the face organ normal image data, and therefore, even in the case where the face normal model 1301 that is the foundation of the face normal image data is reduced, a deterioration of the normal information in the finally obtained integrated normal image data is small. Because of this, by the above method, it is possible to reduce the amount of data of the normal model to be stored in advance.

Further, in the present embodiment, as the face organ normal model, the normal models of the eye, the nose, and the mouth are used, respectively, but the face organs are not limited to those. Some of these face organs may not be used or the normal models of the cheek, the ear, the eyeball and the like may be prepared separately.

Further, in the present embodiment, the smoothness degree for all the face organ normal image data is assumed to be the same, but the smoothness degree may be different for different organs. At this time, the smoothness degree indicated at the three levels, i.e., high, medium, and low may be increased in the number of levels to, for example, four or more. For example, by assuming that the area whose size of the face organ area is smaller has finer convexity/concavity information, the smoothness degree may be set to low. Due to this, it is possible to more enhance the finer convexity/concavity in the lighting processing. Alternatively, it may also be possible to set a lower smoothness degree to the face organ whose face organ area is closer to the center of the face area. Due to this, it is possible to more enhance the three-dimensional effect for the area closer to the face center where convexity/concavity is more conspicuous in the lighting processing. Further, also in the case where the number of levels of smoothness degree is four or more, by repeating the processing shown in FIG. 16 in the order from the normal image data whose smoothness degree is the highest, the integrated normal image data is generated.

Second Embodiment

In the above-described first embodiment, the smoothness degree determined in advance is set to each piece of normal image data for each area, but in the present embodiment, the smoothness degree is set to the normal image data of each area in accordance with the degree of reliability of the face area and the organ position extracted from the color image data. Due to this, it may be possible to generate lighting corrected image data in which the accuracy of the face area and the organ position is taken into consideration. By comparison, the present embodiment differs from the first embodiment in the face information detection processing at step S405 and the smoothness degree setting processing at step S903.

At step S405 of the first embodiment, the face area 601 and the organ position 602 are extracted, but in the present embodiment, besides those, the degrees of reliability of the extracted face area 601 and organ position 602 are determined. Specifically, in the present embodiment, as in the first embodiment, the face area and the organ position are extracted by template matching. First, the face detection unit 302 performs the threshold value processing for the color image data and extracts a skin-colored area as a face candidate area. Then, the face detection unit 302 performs the matching processing for the face candidate area using face image templates of various sizes and calculates a likelihood. Further, the face detection unit 302 performs the determination processing to determine whether or not the face candidate area is the face area based on the likelihood and extracts the face area. The face detection unit 302 performs the same extraction processing for the extracted face area using image templates of the eye, the nose, and the mouth, respectively, also for the organ position. At this time, based on the magnitude of the likelihood, the degrees of reliability of the extracted face area 601 and organ position 602 are determined, respectively.

Figure 19:
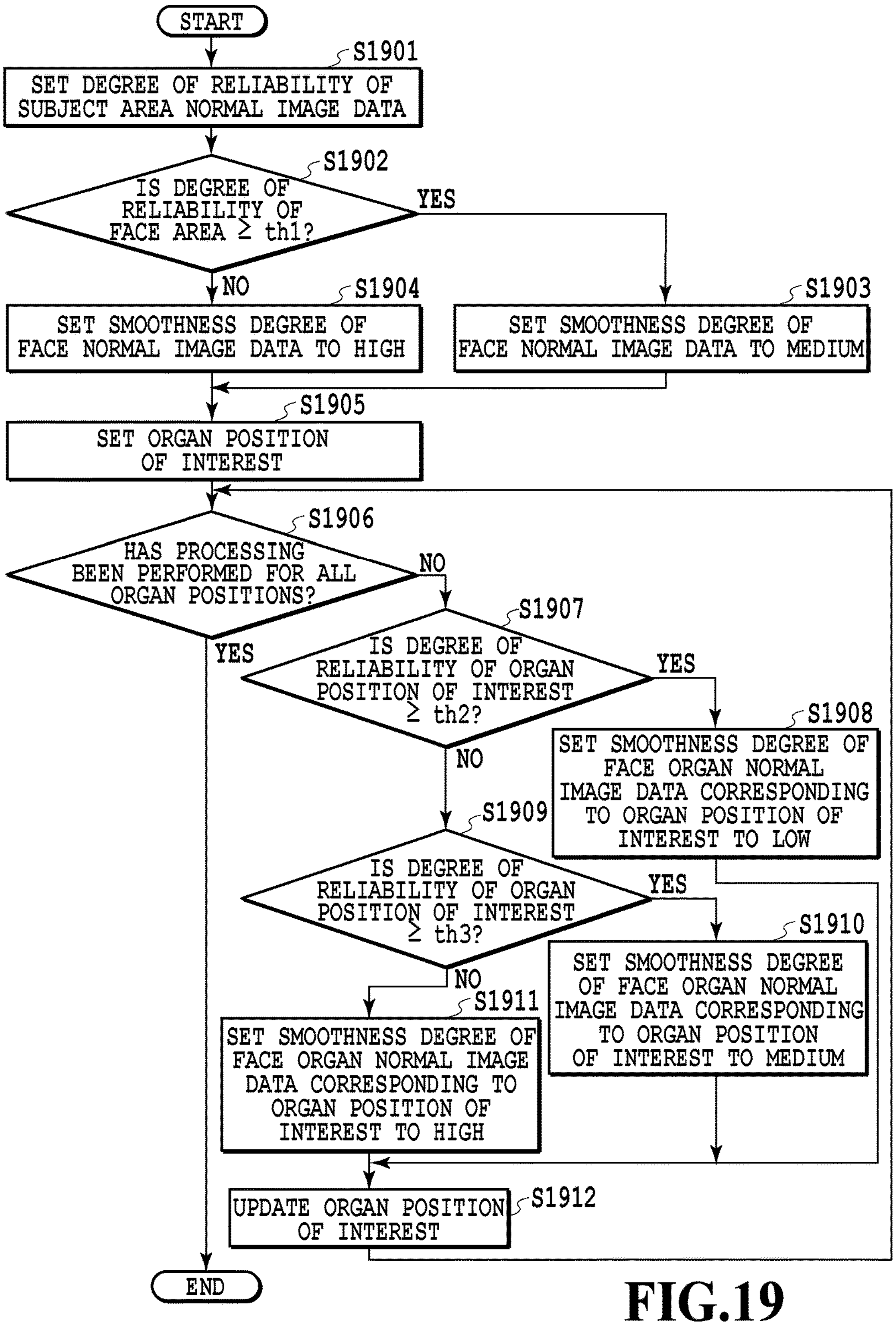
FIG. 19 is a flowchart showing a flow of smoothness degree setting processing in a second embodiment.

The degrees of reliability determined as above are used for the smoothness degree setting processing of the present embodiment. FIG. 19 is a flowchart showing a flow of the smoothness degree setting processing in the present embodiment. In the following, with reference to FIG. 19, details of the smoothness degree setting processing of the present embodiment are explained.

At step S1901, the normal generation unit 304 sets the smoothness degree of the subject normal image data. In the present embodiment, the subject normal image data is generated based on the silhouette shape of a subject, and therefore, the degree of reliability as the normal information is assumed to be low and the smoothness degree is set to high.

At step S1902, the normal generation unit 304 determines whether or not the degree of reliability of the face area is greater than or equal to a threshold value th1. In the case where the degree of reliability of the face area is greater than or equal to the threshold value th1, it is determined that the normal information on the face area is reliable and the processing advances to step S1903. At step S1903, the smoothness degree of the face normal image data is set to medium. In the case where the degree of reliability of the face area is less than the threshold value th1, it is determined that the normal information on the face area is not reliable and the processing advances to step S1904. At step S1904, the smoothness degree of the face normal image data set to high.

At step S1905, the normal generation unit 304 sets an unprocessed organ position as the organ position of interest. At step S1906, the normal generation unit 304 determines whether the processing has been performed for all the organ positions. In the case where all the organ positions have already been processed, the smoothness degree setting processing ends. In the case where there is an unprocessed organ position, the processing advances to step S1907.

At step S1907, the normal generation unit 304 determines whether or not the degree of reliability of the organ position of interest is greater than or equal to a threshold value th2. In the case where the degree of reliability of the organ position of interest is greater than or equal to the threshold value th2, it is determined that the corresponding normal information on the face organ area is reliable and the processing advances to step S1908. At step S1908, the smoothness degree of the corresponding face organ normal image data is set to low. In the case where the degree of reliability of the organ position of interest is less than the threshold value th2, the processing advances to step S1909.

At step S1909, the normal generation unit 304 determines whether or not the degree of reliability of the organ position of interest is greater than or equal to a threshold value th3 that is smaller than the threshold value th2. In the case where the degree of reliability of the organ position of interest is greater than or equal to the threshold value th3, it is determined that the corresponding normal information on the face organ area is reliable to a certain degree and the processing advances to step S1910. At step S1910, the smoothness degree of the corresponding face organ normal image data is set to medium. In the case where the degree of reliability of the organ position of interest is less than the threshold value th3, it is determined that the corresponding normal information on the face organ area is not reliable and the processing advances to step S1911. At step S1911, the smoothness degree of the corresponding face organ normal image data is set to high.

At step S1912, the normal generation unit 304 updates the organ position of interest to an unprocessed organ position. Due to this, the processing at steps S1906 to 1911 is performed for all the organ positions.

Figure 20:
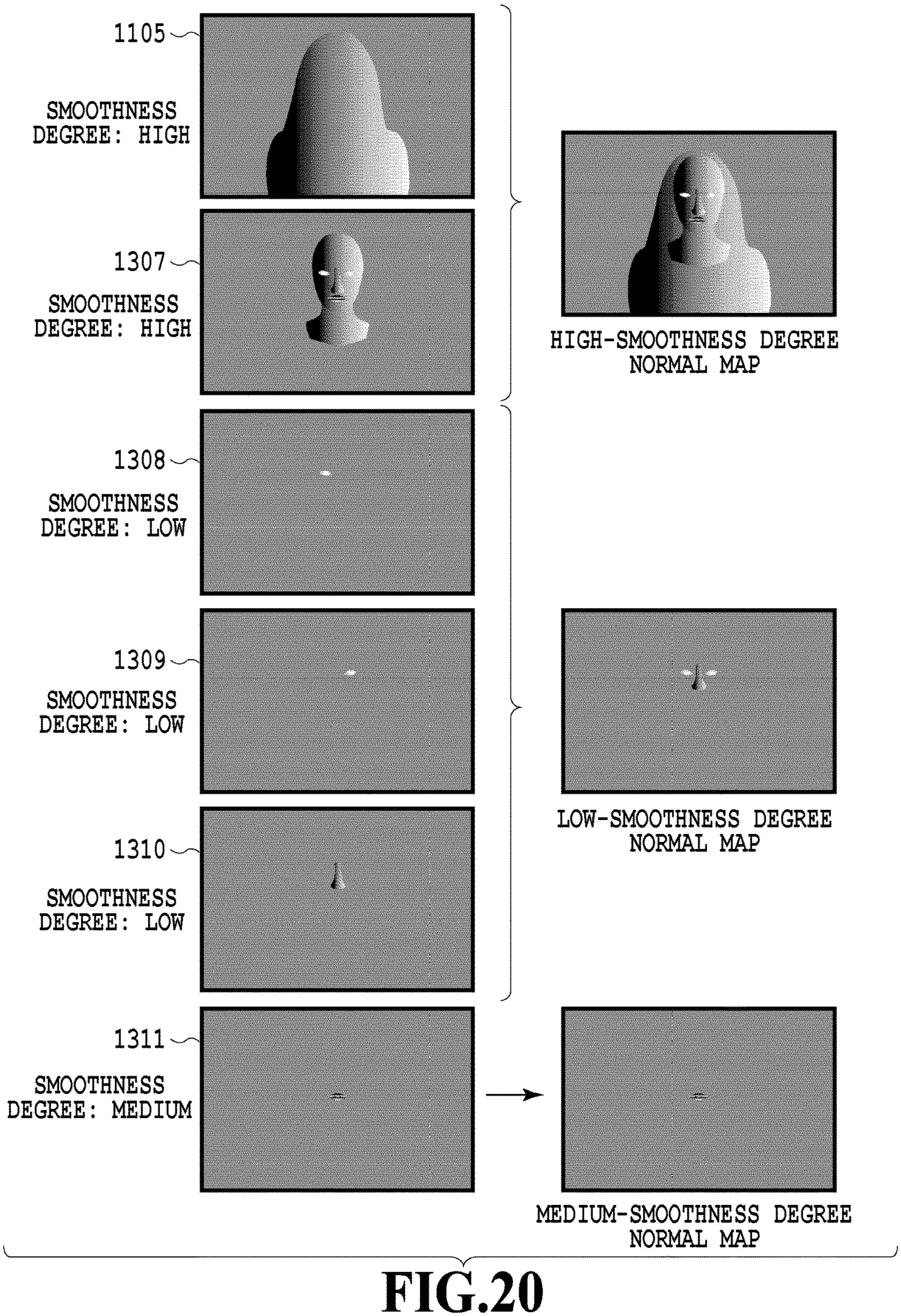
FIG. 20 is a diagram showing results of the smoothness degree setting processing in the second embodiment.

FIG. 20 shows an example of the results of the above smoothness degree setting processing. FIG. 20 shows an example of the case where the smoothness degree of the face normal image data 1307 is high, the smoothness degree of the face organ normal image data 1311 corresponding to the mouth is medium, and the smoothness degree of the face organ normal image data 1308 to 1310 corresponding to the organs other than the mouth is low. In this case, the face normal image data and the face organ normal image data corresponding to the mouth are smoothed with higher intensity than that in the first embodiment. Because of this, even in the case where the positions of the face and the organ corresponding to the mouth deviate from the positions of the face and the mouth of a subject, the convexity/concavity of the normal information is made flat by performing the smoothing processing with high intensity, and therefore, it is possible to suppress the detrimental influence due to the position deviation at the time of lighting processing.

As above, in the present embodiment, the degrees of reliability of the face area and the organ position extracted from the color image data are determined and the smoothness degree of the normal image data of each area is set in accordance with the determined degree of reliability. Then, based on the set smoothness degree, the smoothing processing and the integration processing are repeated in the order from the normal image data with the highest smoothness degree and the integrated normal image data used for the lighting processing is generated. Due to this, it is possible to perform the lighting correction of a subject while suppressing the detrimental influence due to the deviation of the face area and the organ positions.

Third Embodiment

In the above-described embodiments, the lighting processing is performed irrespective of the smoothness degree, but in the present embodiment, the lighting processing is performed depending on the smoothness degree. Specifically, as the lighting processing, processing to add gloss is added newly. At this time, the degree in which gloss is added is changed in accordance with the smoothness degree of the normal information. In the present embodiment, the processing of the normal integration unit 305 and the processing of the lighting processing unit 308 are different from those of the above-described embodiments by comparison.

Figure 21:
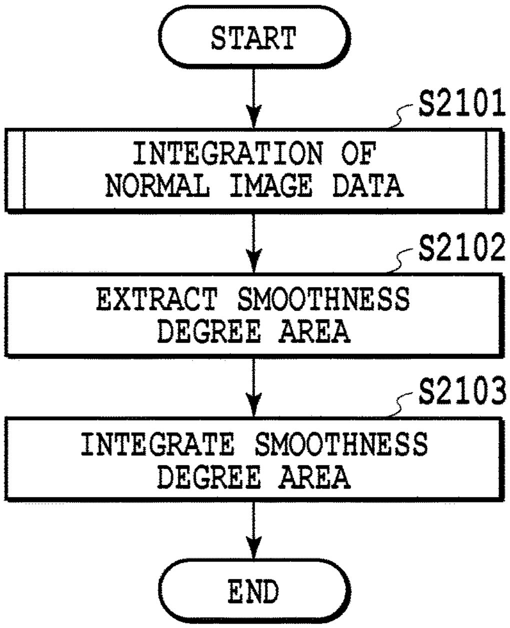
FIG. 21 is a flowchart showing a flow of normal image data integration processing in a third embodiment.

The normal integration unit 305 in the present embodiment also performs the processing to generate a smoothness degree map based on a plurality of pieces of normal image data, in addition to the integration of a plurality of pieces of normal image data with different smoothness degrees. FIG. 21 is a flowchart showing a flow of the processing of the normal integration unit 305 in the present embodiment.

At step S2101, the normal integration unit 305 generates the integrated normal image data by integrating a plurality of pieces of normal image data with different smoothness degrees in accordance with the processing shown in FIG. 14 as in the above-described embodiments.

At step S2102, the normal integration unit 305 extracts a smoothness degree area corresponding to each different smoothness degree. In the present embodiment, the smoothness degree area includes a high-smoothness degree area, a medium-smoothness degree area, and a low-smoothness degree area corresponding to the high smoothness degree, the medium smoothness degree, and the low smoothness degree, respectively. Here, the high-smoothness degree area is an area with the normal information of the high-smoothness degree normal image data and is the subject area in the present embodiment. The medium-smoothness degree area is an area with the normal information of the medium-smoothness degree normal image data and is the face area of a subject in the present embodiment. The low-smoothness degree area is an area with the normal information of the low-smoothness degree normal image data and is the face organ area of a subject in the present embodiment. Further, a different pixel value is given to the high-smoothness degree area, the medium-smoothness degree area, and the low-smoothness degree area, respectively. At this time, a larger value of the pixel value is given to a lower smoothness degree area.

Figure 22:
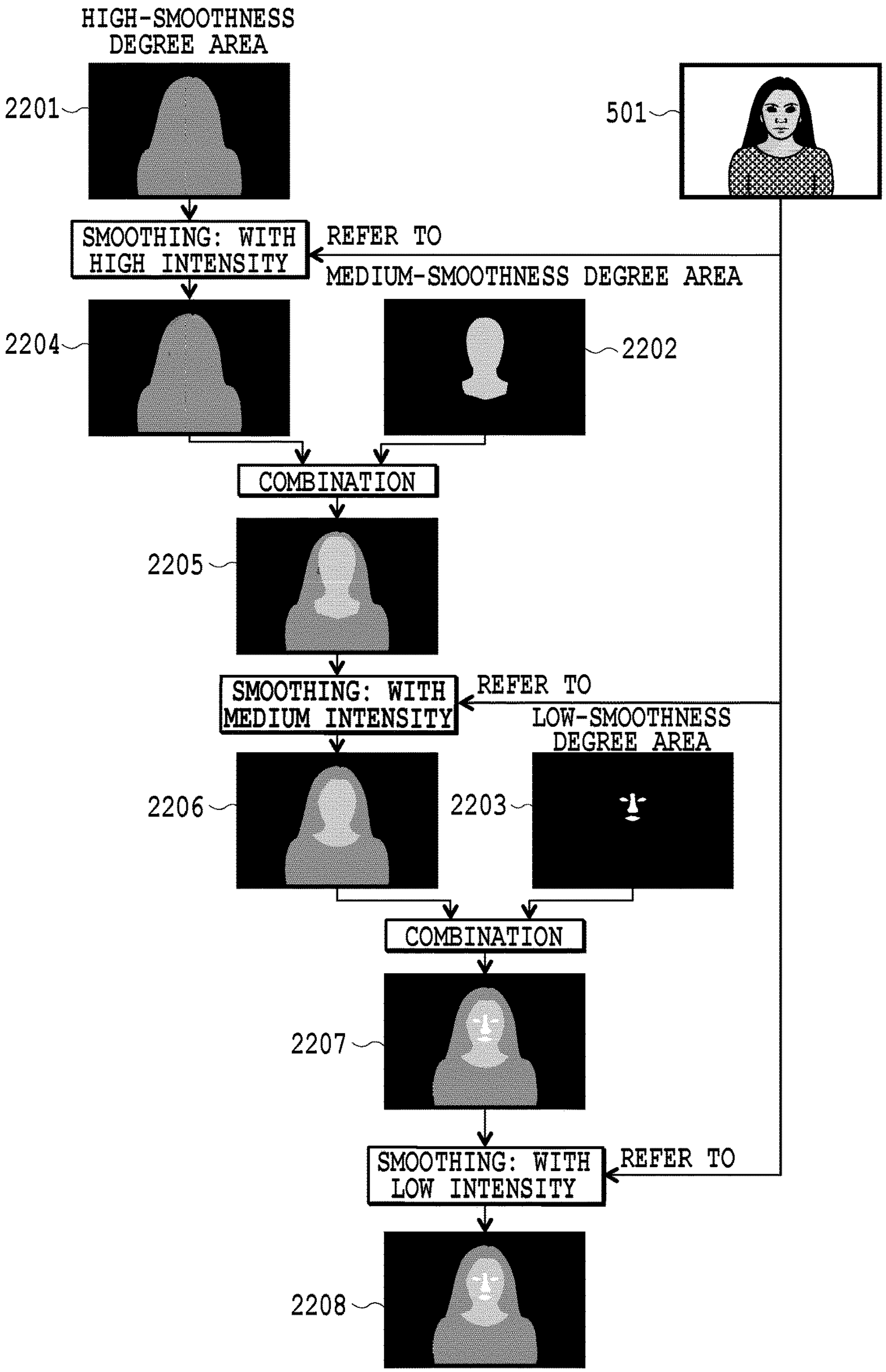
FIG. 22 is a diagram showing an outline of smoothness degree map generation processing in the third embodiment.

At step S2103, the normal integration unit 305 integrates the smoothness degree areas extracted at step S2102 and generates the smoothness degree map. In the present embodiment, the high-smoothness degree area, the medium-smoothness degree area, and the low-smoothness degree area are integrated. FIG. 22 shows a specific example of the processing at this step. First, for a high-smoothness degree area 2201, the smoothing processing is performed with a large-sized filter. As the smoothing processing, it is possible to apply the same processing as the smoothing processing in the normal image data integration processing at step S408. Next, a smoothed area 2204 having been smoothed with a large-sized filter and a medium-smoothness degree area 2202 are integrated. In the present embodiment, only the face area of the smoothed area 2204 having been smoothed with a large-sized filter is overwritten by the pixel value corresponding to the medium-smoothness degree area 2202. Then, for integration results 2205, the smoothing processing is performed with a medium-sized filter. Next, integration results 2206 having been smoothed with a medium-sized filter and a low-smoothness degree area 2203 are integrated. In the present embodiment, only the face organ area of the integration results 2206 having been smoothed with a medium-sized filter is overwritten by the pixel value corresponding to the low-smoothness degree area 2203. Then, for integration results 2207, the smoothing processing is performed with a small-sized filter. Obtained results are taken to be a smoothness degree map 2208.

By the above processing, a smoothness degree map in which an area whose smoothness degree is lower has a larger pixel value is acquired. By using the pixel value as a weight for gloss in the subsequent lighting processing, it is possible to change the degree in which gloss is added to a subject for each area.

The lighting processing unit 308 in the present embodiment uses the smoothness degree map generated by the normal integration unit 305 for the lighting processing along with the integrated normal image data. The lighting processing in the present embodiment performs processing to newly add gloss by a virtual light source, in addition to the processing in the above-described embodiments. Specifically, the processing to generate lighting corrected image data in accordance with expression (6) at step S410 is changed into processing to generate lighting corrected image data in accordance with expression (8) below.

$$I'_r(i,j) = I_r(i,j) + \sum_m \left(k_m(i,j)L_{r,m}I_r(i,j) + u(i,j)s(i,j)L_{r,m}\right)$$
$$I'_g(i,j) = I_g(i,j) + \sum_m \left(k_m(i,j)L_{g,m}I_r(i,j) + u(i,j)s(i,j)L_{g,m}\right)$$
$$I'_b(i,j) = I_b(i,j) + \sum_m \left(k_m(i,j)L_{b,m}I_r(i,j) + u(i,j)s(i,j)L_{b,m}\right) \quad \text{expression (8)}$$

Here, a pixel value u is a pixel value of the smoothness degree map and takes a larger value for the pixel whose smoothness degree is smaller. An intensity value s is a value indicating intensity of gloss by a virtual illumination and can be calculated in accordance with the already-existing Blinn-Phong model that represents specular reflection, the Torrance-Sparrow model and the like. For example, it is possible to calculate the intensity value s in accordance with expression (9) below.

$$s(i,j) = \beta(H(i,j)\cdot N(i,j))^c \quad \text{expression (9)}$$

Figure 23:
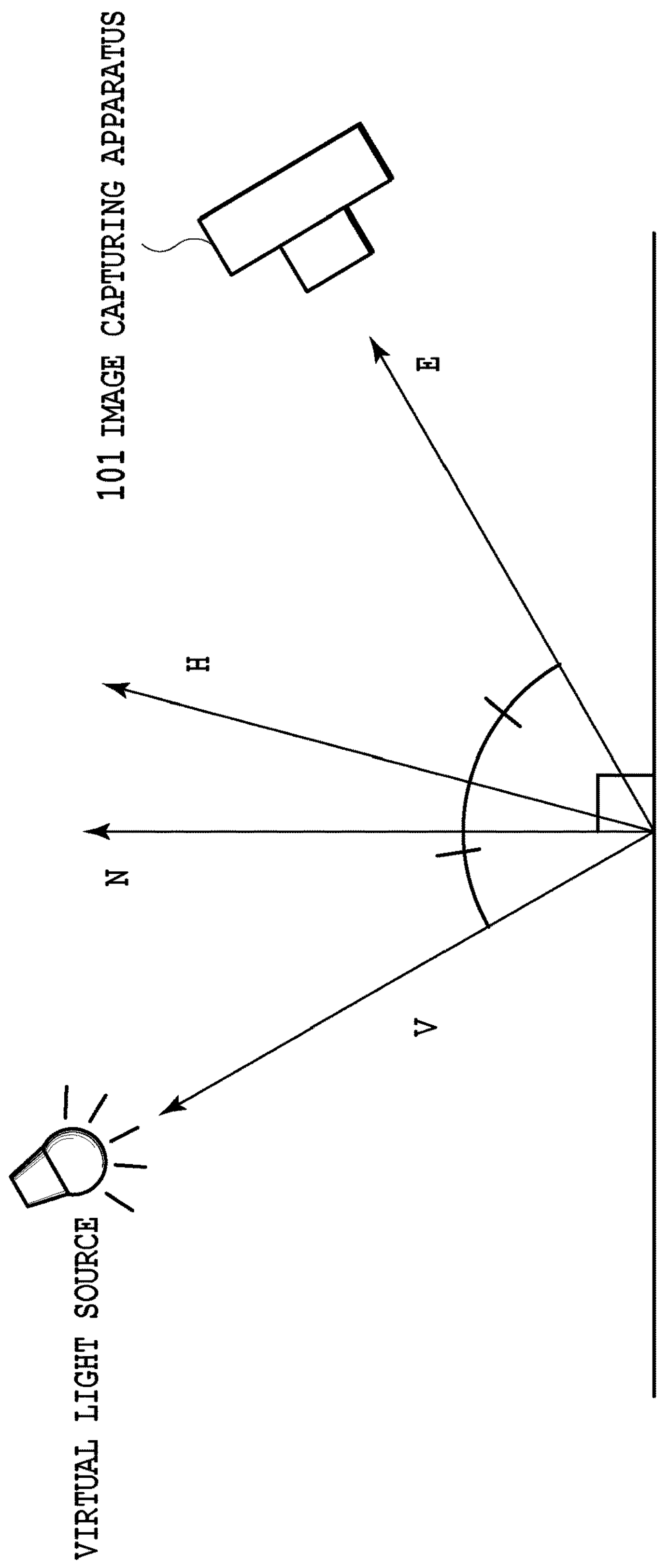
FIG. 23 is a diagram showing an outline of lighting processing in the third embodiment.

Here, intensity β indicates the intensity of specular reflection by a virtual illumination. A parameter c indicates the spread of gloss. The larger the parameter c, the sharper the gloss is and the smaller the parameter c, the softer the gloss is. The gloss that is obtained by expression (9) described above or the like changes sensitively to the shape indicated by the normal vector N. As shown in FIG. 23, a half vector H is obtained by normalizing an averaged vector of a unit vector V in the direction from the position P of the pixel (i, j) toward the position Q of the virtual illumination and a unit vector E in the direction from the position P toward a position C of the image capturing apparatus to 1. In the present embodiment, in the area whose smoothness degree is low, it is assumed that the normal vector N coincides with the shape of a subject and the weight of gloss is increased. On the contrary, in the area whose smoothness degree is low, it is assumed that the normal vector N does not coincide with the shape of a subject and the weight of gloss is decreased. By the above-described processing, it is possible to prevent unnatural gloss from being attached to a subject.

Figure 24A:
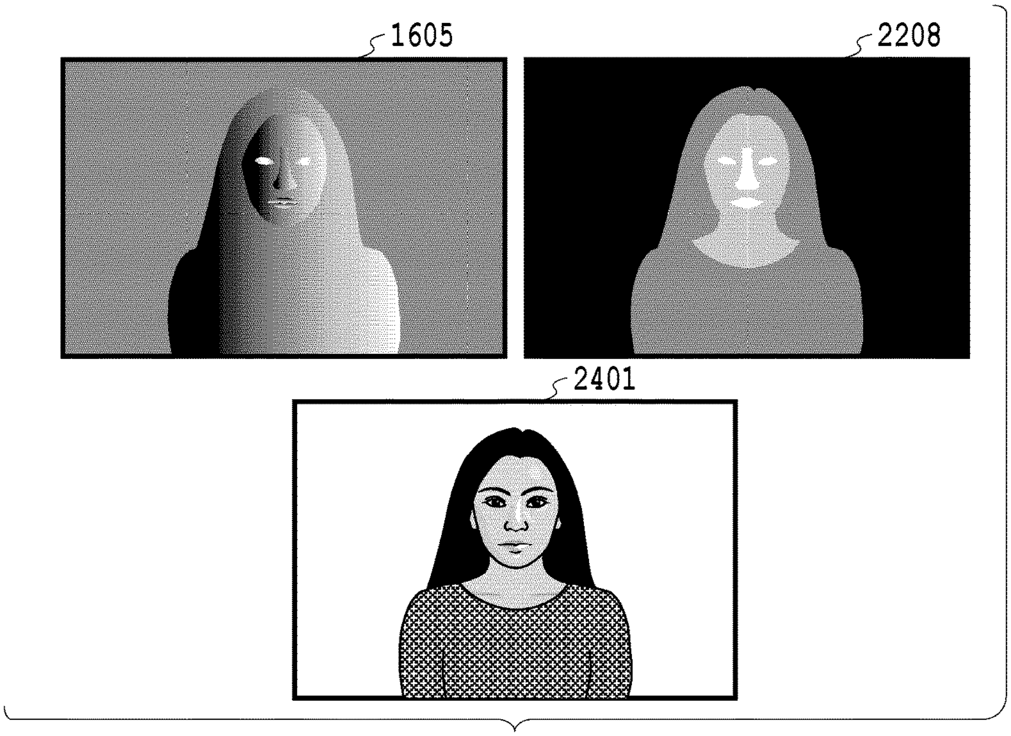
FIG. 24A and FIG. 24B are diagrams showing an effect of the lighting processing in the third embodiment.
Figure 24B:
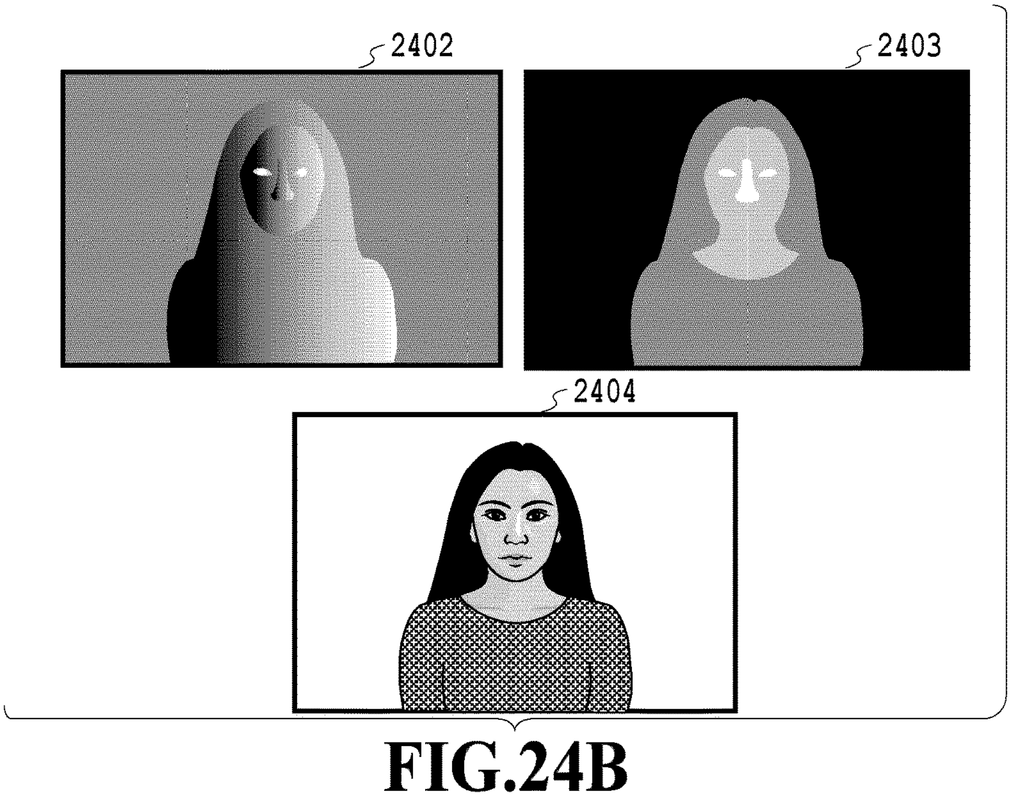

FIG. 24A and FIG. 24B each show an example of the results of the lighting processing according to the present embodiment. Lighting corrected image data 2401 shown in FIG. 24A is the results corresponding to the integrated normal image data 1605 and the smoothness degree map 2208 in the case where the smoothness degree of each face organ area of the eye, the nose, and the mouth is low. In the lighting corrected image data 2401, strong gloss is given to the face organ area around the eye, the nose, and the mouth whose pixel value of the smoothness degree map is large. Lighting corrected image data 2404 shown in FIG. 24B is the results corresponding to the integrated normal image data 2402 and the smoothness degree map 2403 in the case where the smoothness degrees of the face organ area of the eye and the nose are low. Compared with FIG. 24A, the smoothness degree of the mouse is high and the normal vector is smoothed with high intensity, and therefore, the concavity/convexity of the mouth disappears in integrated normal image data 2402. Further, in the smoothness degree map 2403, the pixel value around the mouth is small. Because of this, in the lighting corrected image data 2404, the gloss around the mouth is decreased. That is, in the lighting corrected image data 2401, there is gloss around the mouth, particularly on lip and jaw.

Further, in place of changing the degree in which the weight of gloss is added in accordance with the smoothness degree, it may also be possible to change other characteristics of gloss. For example, it may also be possible to change the spread of gloss. Due to this, it is possible to suppress the occurrence of a feeling of difference, which is caused by sharp gloss being given to the area in which the normal vector N does not coincide with the shape of a subject. Specifically, in the area whose smoothness degree is low, it is assumed that the normal vector N coincides with the shape of a subject and the parameter c indicating the spread of gloss is used as it is, i.e., a predetermined value is used as it is. On the contrary, in the area whose smoothness degree is high, it is assumed that the normal vector N does not coincide with the shape of a subject and the parameter c indicating the spread of gloss is made smaller than the predetermined value. Due to this, in the area whose smoothness degree is high, the spread of gloss becomes large and even in the case where the normal vector N does not coincide with the shape of a subject, it is possible to suppress a feeling of visual difference. As the parameter c indicating the spread of gloss, different values are set in advance to the areas of the eye, the nose, the mouth and the like based on the face area 601, the organ position 602 and the like.

By the above, it is possible to add a three-dimensional effect by gloss to a subject while suppressing a detrimental influence due to the deviation in the face area and the organ position.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment (s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

According to the present invention, it is possible to generate a natural image that seems to have been captured under a desired illumination condition.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-094074, filed May 9, 2016, which is hereby incorporated by reference herein in its entirety.

What is claimed is:

1. An image processing apparatus comprising:

at least one processor; and one or more memories storing instructions that, when executed by the at least one processor, cause the image processing apparatus to function as:

a generation unit configured to generate normal image data in which normal information is stored for each of a plurality of areas at least part of which is different from one another in image data and for each pixel of the area;

a setting unit configured to set one of at least two or more smoothness degrees different from one another to each of a plurality of pieces of generated normal image data;

a smoothing unit configured to smooth each of the plurality of pieces of normal image data in the smoothness degree set by the setting unit;

an integration unit configured to generate integrated normal image data corresponding to pixel arrangement of the image data by integrating the plurality of pieces of normal image data smoothed by the smoothing unit; and a lighting processing unit configured to perform lighting processing for the image data based on the integrated normal image data.

2. The image processing apparatus according to claim 1, wherein the integration unit employs normal information on normal image data whose smoothness degree is relatively low of the plurality of pieces of normal image data for each pixel.

3. The image processing apparatus according to claim 1, wherein the integration unit integrates the plurality of pieces of normal image data in order from normal image data whose smoothness degree is high.

4. The image processing apparatus according to claim 3, wherein the integration unit integrates the plurality of pieces of normal image data by dividing integration processing into a plurality of times of integration processing and smoothes results of the integration processing with higher intensity for normal image data whose smoothness degree is higher integrated in the integration processing after each piece of integration processing.

5. The image processing apparatus according to claim 1, wherein the smoothness degree is set in accordance with a degree of reliability corresponding to the plurality of areas.

6. The image processing apparatus according to claim 1, wherein the normal image data is normal image data corresponding to one of at least a subject area, a face area, and a face organ area.

7. The image processing apparatus according to claim 6, further comprising:

a unit configured to acquire distance image data corresponding to the image data, wherein the generation unit calculates the normal image data corresponding to the subject area based on the distance image data.

8. The image processing apparatus according to claim 6, further comprising:

a face detection unit configured to detect face information from the image data, wherein the generation unit calculates normal image data corresponding to the face area by deforming a face normal model based on the face information and calculates normal image data corresponding to the face organ area by deforming a face organ normal model based on the face information.

9. The image processing apparatus according to claim 1, wherein the lighting processing includes processing to newly add gloss, and the lighting processing unit changes characteristics of the gloss for each area based on the smoothness degree.

10. An image processing method, the method comprising the steps of:

generating normal image data in which normal information is stored for each of a plurality of areas at least part of which is different from one another in image data and for each pixel of the area;

setting one of at least two or more smoothness degrees different from one another to each of a plurality of pieces of generated normal image data;

smoothing each of the plurality of pieces of normal image data in the set smoothness degree;

generating integrated normal image data corresponding to pixel arrangement of the image data by integrating the plurality of pieces of smoothed normal image data; and performing lighting processing for the image data based on the integrated normal image data.

11. A non-transitory computer readable storage medium storing a program for causing a computer to perform an image processing method, the method comprising the steps of:

generating normal image data in which normal information is stored for each of a plurality of areas at least part of which is different from one another in image data and for each pixel of the area;

setting one of at least two or more smoothness degrees different from one another to each of a plurality of pieces of generated normal image data;

smoothing each of the plurality of pieces of normal image data in the set smoothness degree;

generating integrated normal image data corresponding to pixel arrangement of the image data by integrating the plurality of pieces of smoothed normal image data; and performing lighting processing for the image data based on the integrated normal image data.

* * * * *